US012761625B2

(12) United States Patent
Koga et al.

(10) Patent No.: US 12,761,625 B2
(45) Date of Patent: Oct. 13, 2026

(54) CONTROL DEVICE OF MACHINE TOOL FOR POSITION AND/OR POSTURE OFFSET

(71) Applicant: FANUC CORPORATION, Yamanashi (JP)

(72) Inventors: Daijirou Koga, Yamanashi (JP); Daisaku Soma, Yamanashi (JP); Hiroki Sawaoka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 326 days.

(21) Appl. No.: 18/557,238

(22) PCT Filed: May 28, 2021

(86) PCT No.: PCT/JP2021/020357
§ 371 (c)(1),
(2) Date: Oct. 25, 2023

(87) PCT Pub. No.: WO2022/249438
PCT Pub. Date: Dec. 1, 2022

(65) Prior Publication Data
US 2024/0219884 A1 Jul. 4, 2024

(51) Int. Cl.
*G05B 19/23* (2006.01)
*G05B 19/4103* (2006.01)

(52) U.S. Cl.
CPC ......... *G05B 19/23* (2013.01); *G05B 19/4103* (2013.01)

(58) Field of Classification Search
CPC ................ G05B 19/23; G05B 19/4103; G05B 2219/33272; G05B 19/408; B25J 9/1656; Y02P 90/02
(Continued)

(56) References Cited

U.S. PATENT DOCUMENTS 6,757,587 B1 6/2004 English et al.
2007/0233280 A1 10/2007 Bacon et al.
(Continued)

FOREIGN PATENT DOCUMENTS

CN 102581445 A 7/2012
CN 109116810 A 1/2019
(Continued)

OTHER PUBLICATIONS

International Search Report issued in PCT/JP2021/020357; mailed Aug. 10, 2021.

*Primary Examiner* — Michael J Brown
(74) *Attorney, Agent, or Firm* — Studebaker Brackett PLLC

(57) ABSTRACT

Provided is a control device capable of shifting the movement path of automatic operation with respect to a given coordinate system of a machine configuration, without increasing the calculation load of interpolating processing. This control device comprises: a command analysis unit; an interpolation unit; a pulse generation unit; a graph generation unit that generates a graph indicating a machine configuration of a machining tool and/or a robot; a shift additional node specification unit that specifies any node of the graph, in order to add, to the node of the graph, shift information including an external movement amount inputted from outside; a shift information setting unit that sets, on the basis of the shift information, the shift information with respect to a position offset and/or an attitude offset of the specified node; and a kinematics conversion unit that, on the basis of the position offset and/or the attitude offset set to the node, converts a program coordinate value included in the movement command to a motor coordinate value.

4 Claims, 25 Drawing Sheets

(58) Field of Classification Search
USPC .......................................................... 700/159
See application file for complete search history.

(56) References Cited

U.S. PATENT DOCUMENTS

| | | | |
|---|---|---|---|
| 2012/0324415 A1 | 12/2012 | Keibel et al. | |
| 2017/0003671 A1* | 1/2017 | Ishii ........................ | B23Q 1/54 |
| 2019/0369592 A1* | 12/2019 | Oonishi .................. | G06F 1/206 |
| 2020/0319620 A1* | 10/2020 | Miyake ................ | G05B 19/182 |

FOREIGN PATENT DOCUMENTS

| | | | |
|---|---|---|---|
| DE | 600 10 609 | T2 | 7/2005 |
| JP | S63-308604 | A | 12/1988 |
| JP | H07-299697 | A | 11/1995 |
| JP | 2019-057262 | A | 4/2019 |
| JP | 2019-212040 | A | 12/2019 |

* cited by examiner

MACHINE CONFIGURATION TREE

112: HOMOGENEOUS MATRIX $M_A$ REPRESENTING POSITION AND POSTURE OF CONNECTION POINT 120

113: HOMOGENEOUS MATRIX $M_B$ REPRESENTING POSITION AND POSTURE OF CONNECTION POINT 110

MACHINE CONFIGURATION

MACHINE CONFIGURATION TREE

CONTROL DEVICE OF MACHINE TOOL FOR POSITION AND/OR POSTURE OFFSET

TECHNICAL FIELD

The present invention relates to a control device.

BACKGROUND ART

Conventionally, insufficient machining may occur in automatic operation of a machine tool. In such a case, there is a function of eliminating insufficient machining occurring in automatic operation by giving a movement amount externally and shifting the path of automatic operation (for example, refer to Patent Documents 1 and 2).

For example, when the machining point is changed by manual intervention, the apparatus described in Patent Document 1 maintains the coordinate value indicating the position of the machining point by reflecting the movement amount by manual intervention in the shift amount of the coordinate system. With such a configuration, the apparatus described in Patent Document 1 behaves as if there were no manual intervention and shifts the path of automatic operation.

However, the technology described in Patent Document 1 cannot deal with, for example, rotation of a table rotary shaft of a five-axis milling machine. Furthermore, the apparatus described in Patent Document 2 performs mounting error compensation of a workpiece. By performing similar processing as in Patent Document 2, it is conceivable to cause the shift direction in which the movement path of the automatic operation is shifted to follow the table rotation shaft according to the angle of the table rotation shaft.

Patent Document 1: Japanese Unexamined Patent Application, Publication No. S63-308604

Patent Document 2: Japanese Unexamined Patent Application, Publication No. H7-299697

DISCLOSURE OF THE INVENTION

Problems to be Solved by the Invention

However, in the conventional technology, the movement amount can be simply reflected externally only by a machine coordinate system as described in Patent Document 1 or a program coordinate system as described in Patent Document 2. That is, in the conventional technology, the movement amount cannot be reflected externally by another coordinate system. Furthermore, in the technology described in Patent Document 2, it is necessary to perform calculation for shifting the path of automatic operation in the interpolation processing.

Generally, in order to continuously control the machine tool, it is necessary for the numerical controller to continuously generate without interruption pulses generated by the interpolation process. For this reason, the interpolation processing is required to be completed within a certain period. Therefore, there is a demand for a control device capable of shifting a movement path of automatic operation with respect to any coordinate system in a machine configuration without increasing the calculation load of interpolation processing.

Means for Solving the Problems

An aspect of the present disclosure relates to a control device including: a command analysis unit that analyzes a command including a machining program for machining a workpiece and outputs an analysis result including a program coordinate value; an interpolation unit that performs interpolation processing on the analysis result analyzed by the command analysis unit and generates a movement command of respective axes of a machine tool and/or a robot; a pulse generation unit that generates a drive pulse for driving the respective axes based on the movement command; a graph generation unit that generates a graph indicating a machine configuration of the machine tool and/or the robot; a shift addition node designation unit that designates any node of the graph, in order to add, to a node of the graph, shift information including an external movement amount externally inputted; a shift information setting unit that sets the shift information for a position offset and/or posture offset of the designated node based on the shift information; and a kinematics conversion unit that converts a program coordinate value included in the movement command to a motor coordinate value based on the position offset and/or the posture offset set in the node.

Effects of the Invention

According to an aspect of the present invention, it is possible to shift the movement path of the automatic operation with respect to any coordinate system in the machine configuration without increasing the calculation load of the interpolation processing.

PREFERRED MODE FOR CARRYING OUT THE INVENTION

1. Overall Configuration

Figure 1:
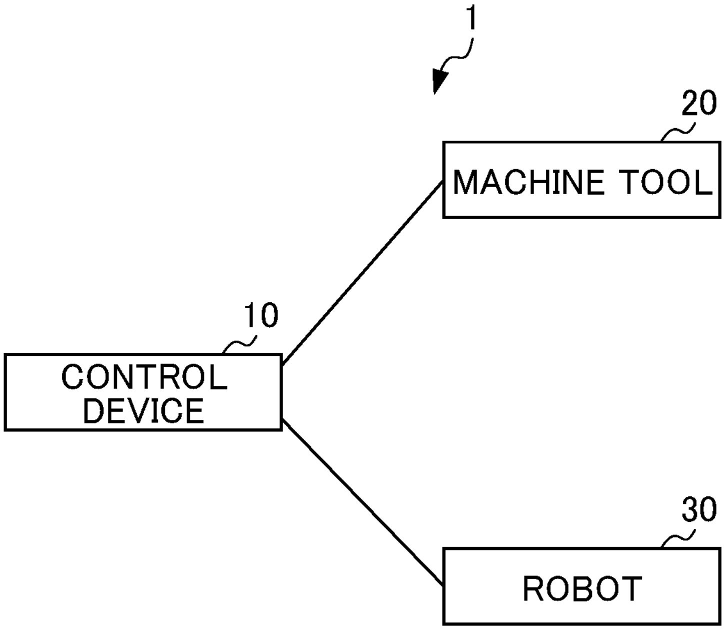
FIG. 1 is a block diagram showing a configuration of a control system according to an embodiment of the present embodiment.

FIG. 1 is a diagram showing a configuration of a control system 1 according to the present embodiment. As shown in FIG. 1, the control system 1 includes a control device 10, a machine tool 20, and a robot 30.

The control device 10 is communicably connected to the machine tool 20 and the robot 30, and controls the machine tool 20 and the robot 30. The control device 10 may be communicably connected to one of the machine tool 20 and the robot 30, and may control only one of the machine tool 20 and the robot 30.

That is, the control device 10 may be a control device that controls both the machine tool 20 and the robot 30. The control device 10 may function as a numerical control device for controlling the machine tool 20 or a robot control device for controlling the robot 30.

2. Configuration of Control Device 10

Figure 2:
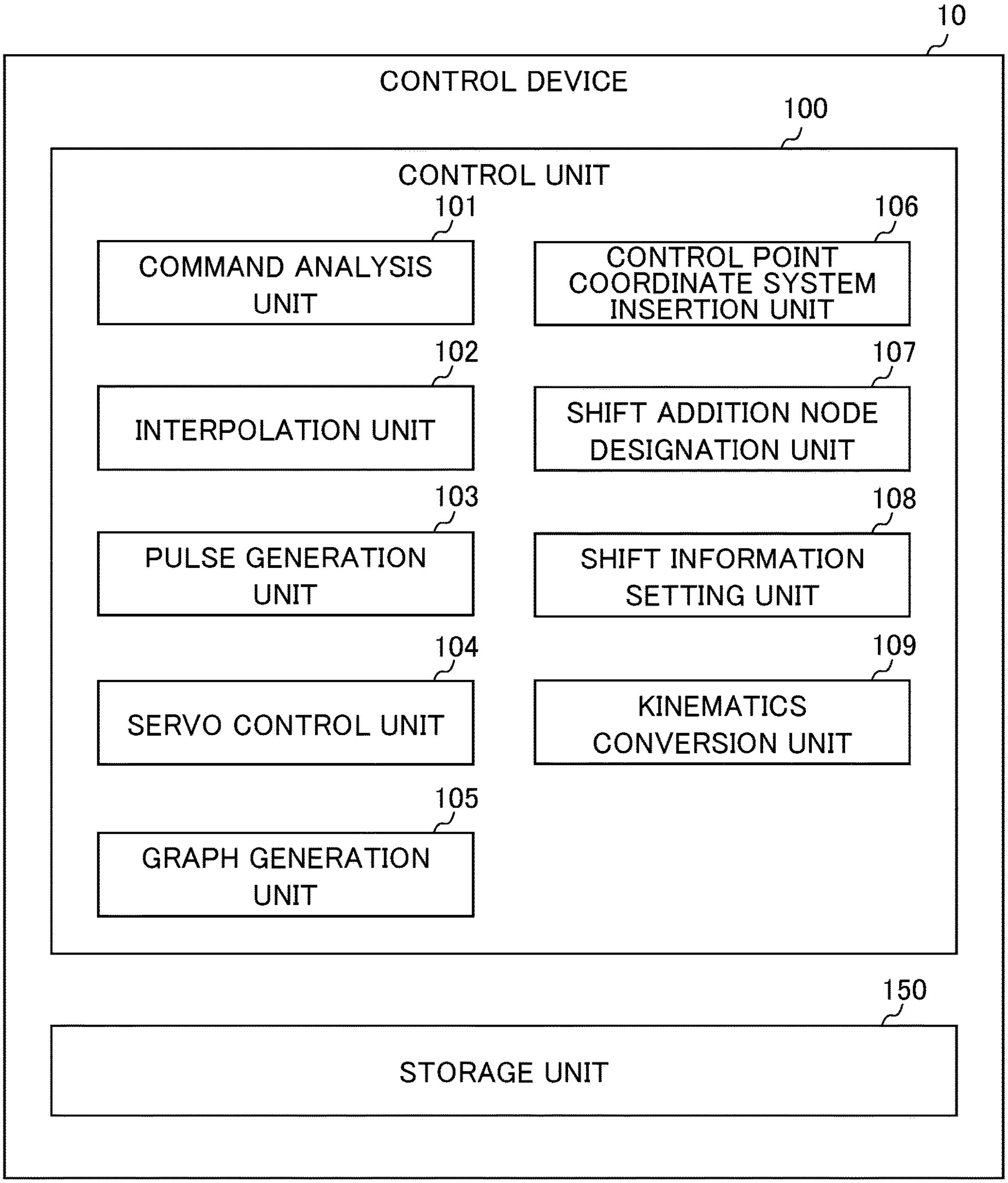
FIG. 2 is a block diagram showing a configuration of a control device according to the present embodiment.
Figure 3:
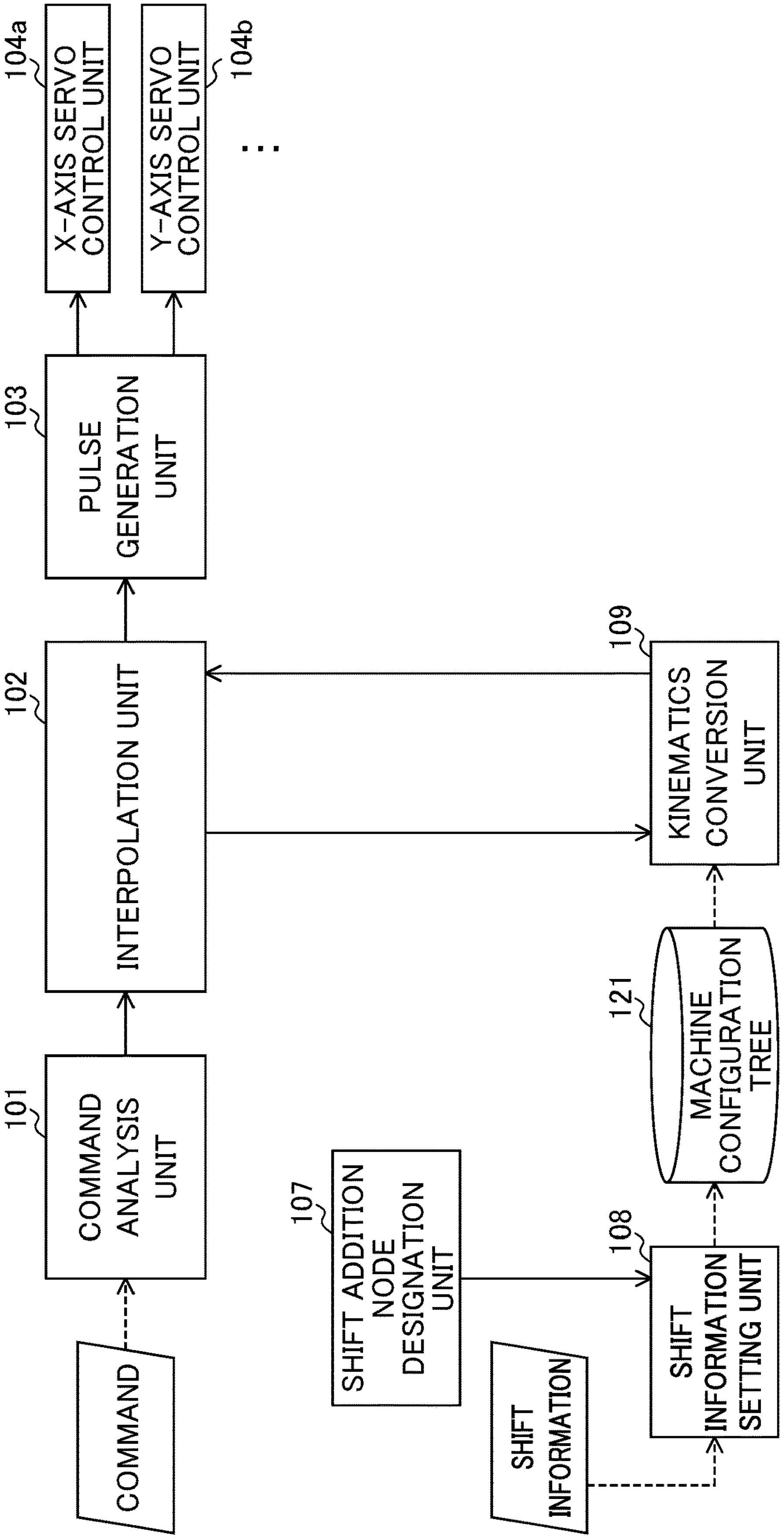
FIG. 3 is a block diagram showing an outline of processing of the control device according to the present embodiment.

FIG. 2 is a block diagram showing a configuration of the control device 10 according to the present embodiment. FIG. 3 is a block diagram showing an outline of processing of the control device 10 according to the present embodiment.

As shown in FIG. 2, the control device 10 includes a control unit 100 and a storage unit 150. The control unit 100 is a processor that controls the control device 10 overall. The control unit 100 implements various functions by executing a system program and an application program stored in the storage unit 150.

Further, the control unit 100 includes a command analysis unit 101, an interpolation unit 102, a pulse generation unit 103, a servo control unit 104, a graph generation unit 105, a control point coordinate system insertion unit 106, a shift addition node designation unit 107, a shift information setting unit 108, and a kinematics conversion unit 109.

The storage unit 12 is a storage device such as a ROM (Read Only Memory) for storing an OS (Operating System), application programs, and the like, RAM (Random Access Memory), a hard disk drive for storing various other information, or a SSD (Solid State Drive). The storage unit 150 stores, for example, a system program, an application program, information related to a machine configuration tree generated by the graph generation unit 105, which will be described later, and the like.

The command analysis unit 101 analyzes a command including a machining program for machining a workpiece, and converts the command into an execution format. The command analysis unit 101 outputs the analysis result converted into the execution format to the interpolation unit 102. Here, the machining program is a program for automatically operating the machine tool 20 and/or the robot 30. The analysis result includes program coordinate values. The program coordinate value indicates one or more command values commanded in the program, and the program coordinate system indicates a coordinate system of one or more command values commanded in the program.

The interpolation unit 102 performs interpolation processing on the analysis result analyzed by the command analysis unit 101, and generates movement commands for each axis of the machine tool 20 and/or the robot 30. The generated movement command includes error compensation for each axis. The interpolation unit 102 outputs the generated movement command to the pulse generation unit 103.

Specifically, the interpolation unit 102 outputs the program coordinate values (i.e., the starting point and the ending point in the program coordinate system) included in the analysis result to the kinematics conversion unit 109, and receives the motor coordinate values (i.e., the starting point and the ending point in the motor coordinate system) converted by the kinematics conversion unit 109. Then, the interpolation unit 102 calculates a difference between the starting point and the ending point of the motor coordinate value, and outputs a movement command including the difference to the pulse generation unit 103.

The pulse generation unit 103 generates drive pulses for driving each axis of the machine tool 20 and/or the robot 30 based on the movement command generated by the interpolation unit 102. The pulse generation unit 103 outputs the generated drive pulse to the servo control unit 104.

The servo control unit 104 rotates the motors (not shown) of the respective axes in accordance with the drive pulses sent from the pulse generation unit 103. The servo control unit 104 indicates a servo control unit for each axis of the machine tool 20 and/or the robot 30. That is, as shown in FIG. 3, the servo control unit 104 includes an X-axis servo control unit 104*a*, a Y-axis servo control unit 104*b*, and so on. FIG. 3 shows only the X-axis servo control unit 104*a* and the Y-axis servo control unit 104*b* among the servo control units of the respective axes, and the servo control units of the other axes are not shown.

The graph generation unit 105 generates a graph indicating the machine configuration of the machine tool 20 and/or the robot 30. Specifically, the graph generation unit 105 generates a machine configuration tree 121 indicating the machine configuration of the machine tool 20 and/or the robot 30. Further, the graph generation unit 105 adds a node to the generated graph. Specifically, the graph generation unit 105 adds a node to the generated machine configuration tree 121. The detailed operation thereof will be described later in detail with reference to "3. Generation of Machine Configuration Tree".

The control point coordinate system insertion unit 106 inserts a control point and a coordinate system into the graph of the machine configuration. The detailed operation will be described in the following "4. Automatic Insertion of Control Point and Coordinate Value".

The shift addition node designation unit 107 designates any node in the graph in order to add shift information including an external movement amount externally inputted to the node of the graph generated by the graph generation unit 105. Here, the external movement amount indicates a movement amount externally inputted. For example, the external movement amount may be a movement amount between a starting point and an ending point of the tool position when the tool position of the machine tool 20 is moved by a handwheel. Alternatively, the shift information may be a movement amount generated by an operation other than the automatic operation by the machining program. For example, the shift information may be a value in which, when the tool position of the machine tool 20 is moved by the manual handle, an external movement amount moved by the handwheel is stored as a movement value of a certain coordinate system.

The shift information setting unit 108 sets the shift information for the position offset and/or the posture offset of the node designated by the shift addition node designation unit 107 based on the shift information.

The kinematics conversion unit 109 converts the program coordinate value included in the movement command into the motor coordinate value based on the position offset and/or the posture offset set in the node. With such a configuration, the kinematics conversion unit 109 can shift the motor coordinate value by the external movement amount by the shift information set in the position offset and/or the posture offset.

3. Generation of Machine Configuration Tree

The graph generation unit 105 according to the embodiment of the present invention first generates the graph showing the machine configuration. A method of generating a machine configuration tree as an example of the graph will be described in detail with reference to FIGS. 4 to 10.

Figure 4:
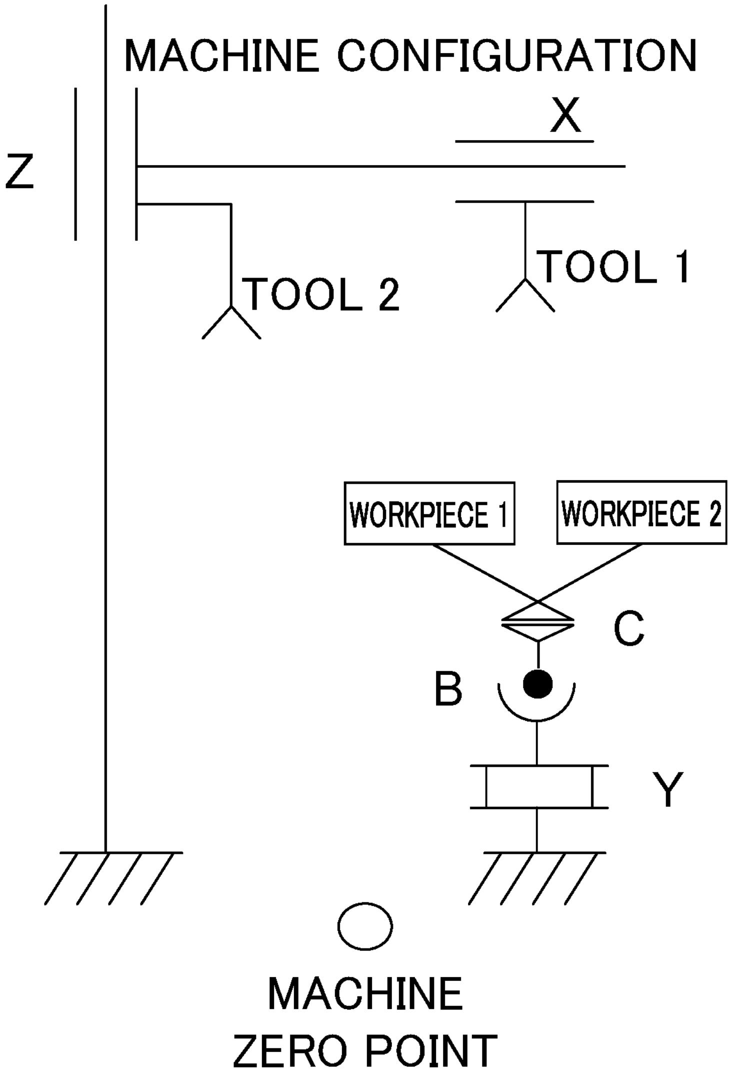
FIG. 4 is an explanatory diagram of a method of generating a machine configuration tree according to the present embodiment.

As the example, the method of generating the machine configuration tree indicating the configuration of a machine shown in FIG. 4 will be described. In the machine of FIG. 4, it is assumed that an X axis is set perpendicular to a Z axis, that a tool 1 is installed in the X axis and that a tool 2 is installed in the Z axis. On the other hand, it is assumed that a B axis is set on a Y axis, that a C axis is set on the B axis and that a workpiece 1 and a workpiece 2 are installed in the C axis. The method of indicating the machine configuration as the machine configuration tree will be described below.

Figure 5:
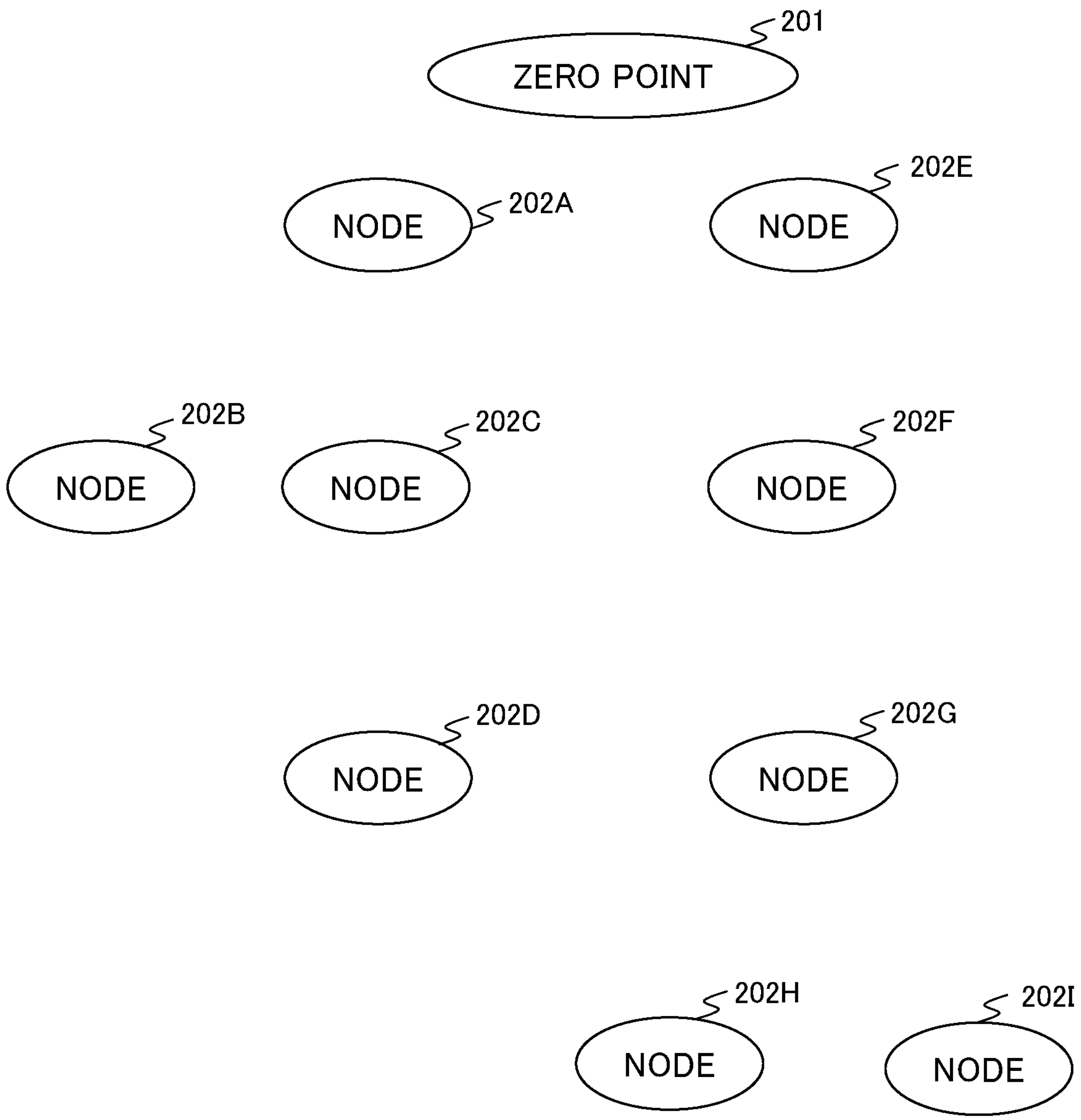
FIG. 5 is an explanatory diagram of a method of generating a machine configuration tree according to the present embodiment.

First, as shown in FIG. 5, only a zero point 201 and nodes 202A to 202I are arranged. In this stage, there is no connection between the zero point 201 and the nodes 202 and between the nodes 202, and the names of the zero point and the nodes are not set.

Figure 6:
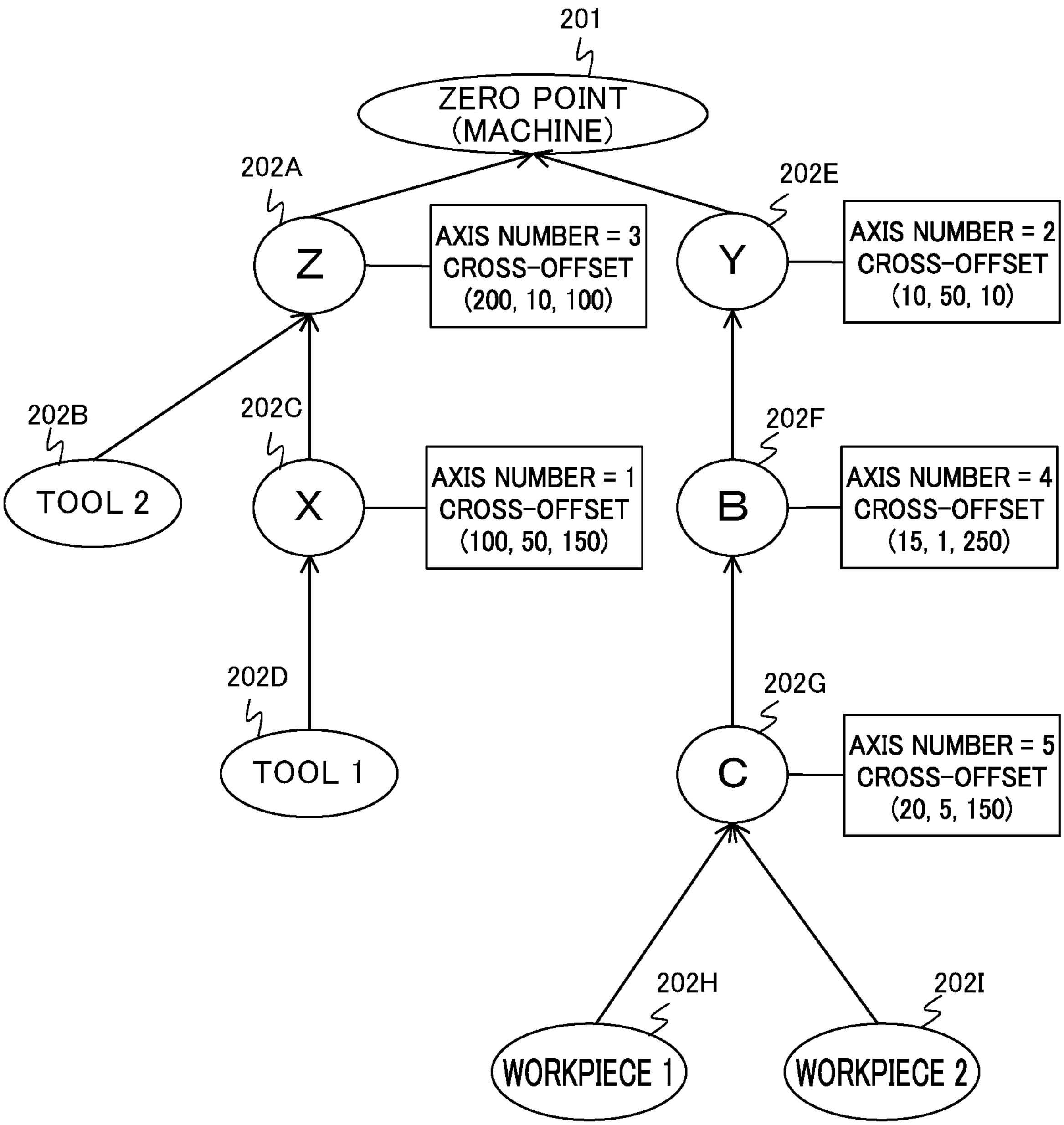
FIG. 6 is an explanatory diagram of a method of generating a machine configuration tree according to the present embodiment.

Then, the axis names (axis types) of the individual axes, the names of the individual tools, the names of the individual workpieces, the names of the individual zero points and the physical axis numbers (axis types) of the individual axes are set. Then, the parent nodes (axis types) of the individual axes, the parent nodes of the individual tools and the parent nodes of the individual workpieces are set. Finally, the cross-offsets (axis types) of the individual axes, the cross-offsets of the individual tools and the cross-offsets of the individual workpieces are set. Consequently, the machine configuration tree shown in FIG. 6 is generated.

Each node of the machine configuration tree is not limited to the pieces of information described above, and it may or may not have information related to, for example, an identifier (name), the identifier of the parent node of itself, the identifiers of all child nodes whose parents are itself, a relative offset (cross-offset) with respect to the parent node, a relative coordinate value with respect to the parent node, a relative movement direction (unit vector) with respect to the parent node, node types (linear axis/rotary axis/unit (which will be described later)/control point/coordinate system/zero point and the like), the physical axis number and the transformation formulas of an orthogonal coordinate system and a physical coordinate system.

As described above, values are set to the individual nodes, such that the graph generation unit 105 generates data which has a data structure in the shape of a machine configuration tree. Furthermore, even when another machine (or robot) is added, a zero point is added, and thus it is possible to further add nodes.

Figure 7:
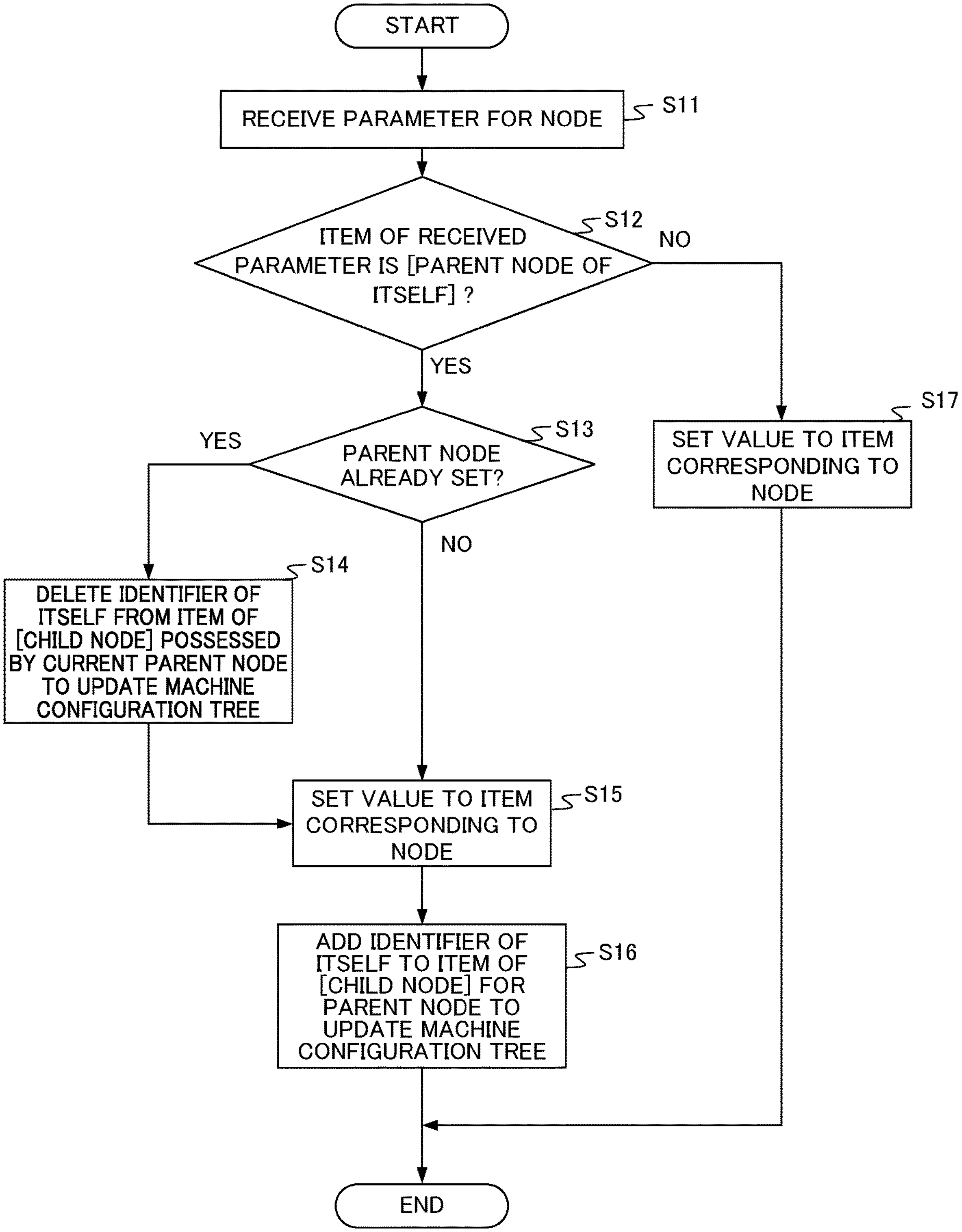
FIG. 7 is a flowchart showing a method of generating a machine configuration tree according to the present embodiment.

A flowchart obtained by generalizing the method of generating the machine configuration tree described above, in particular, the method of setting the values to the individual nodes is shown in FIG. 7.

In Step S11, the graph generation unit 105 receives the value of a parameter set to the node. When in Step S12, the item of the set parameter is "parent node of itself" (yes in S12), the processing is transferred to Step S13. When the item of the set parameter is not "parent node of itself" (no in S12), the processing is transferred to Step S17.

When in Step S13, a parent node has already been set to the node to which the parameter is set (yes in S13), the processing is transferred to Step S14. When a parent node has not been set (no in S13), the processing is transferred to Step S15.

In Step S14, the graph generation unit 105 deletes the identifier of itself from the item of "child node" possessed by the current parent node of the node to which the parameter is set so as to update the machine configuration tree.

In Step S15, the graph generation unit 105 sets the value to the corresponding item of the node to which the parameter is set.

In Step S16, the graph generation unit 105 adds the identifier of itself to the item of "child node" in the parent node so as to update the machine configuration tree, and thereafter the flow is completed.

In Step S17, the graph generation unit 105 sets the value to the corresponding item of the node to which the parameter is set, and thereafter the flow is completed.

Figure 8A:
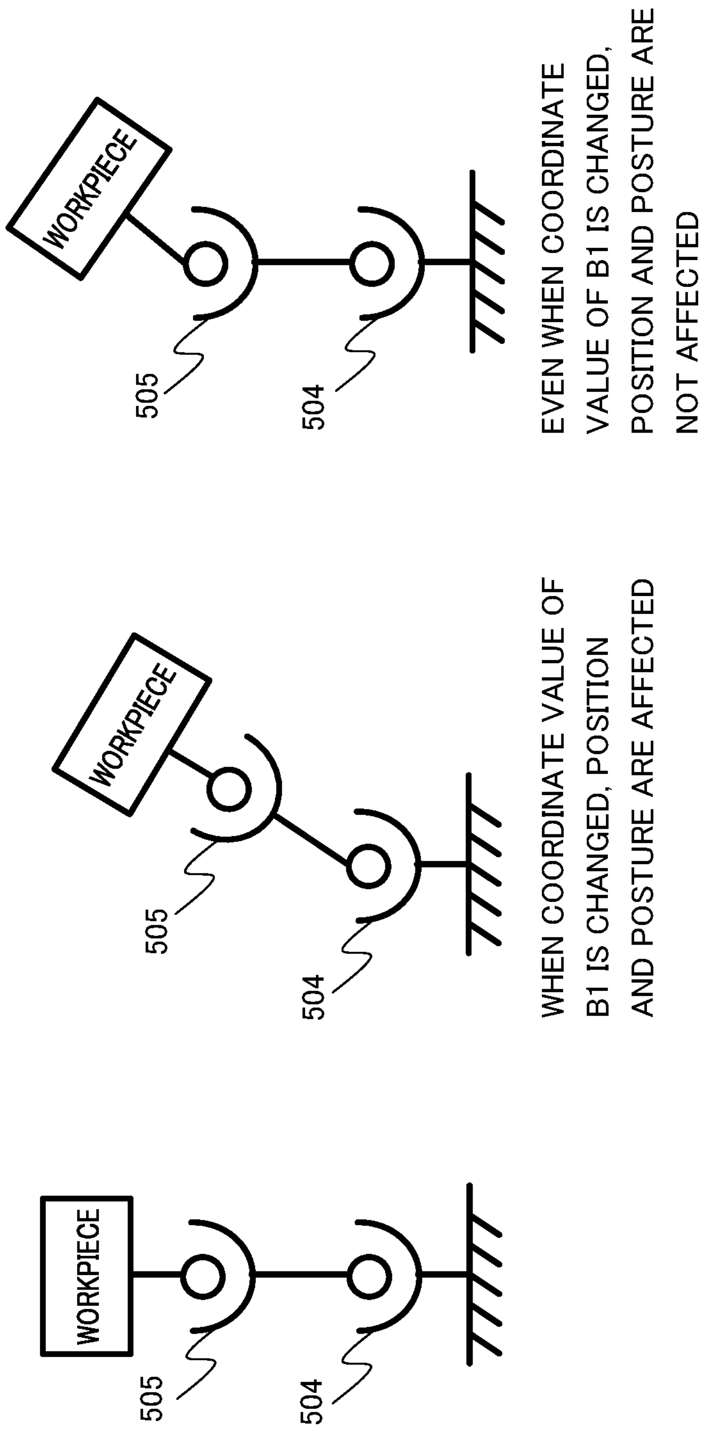
FIG. 8A is an explanatory diagram of a parent-child relationship of the components of a machine according to the present embodiment.
Figure 8B:
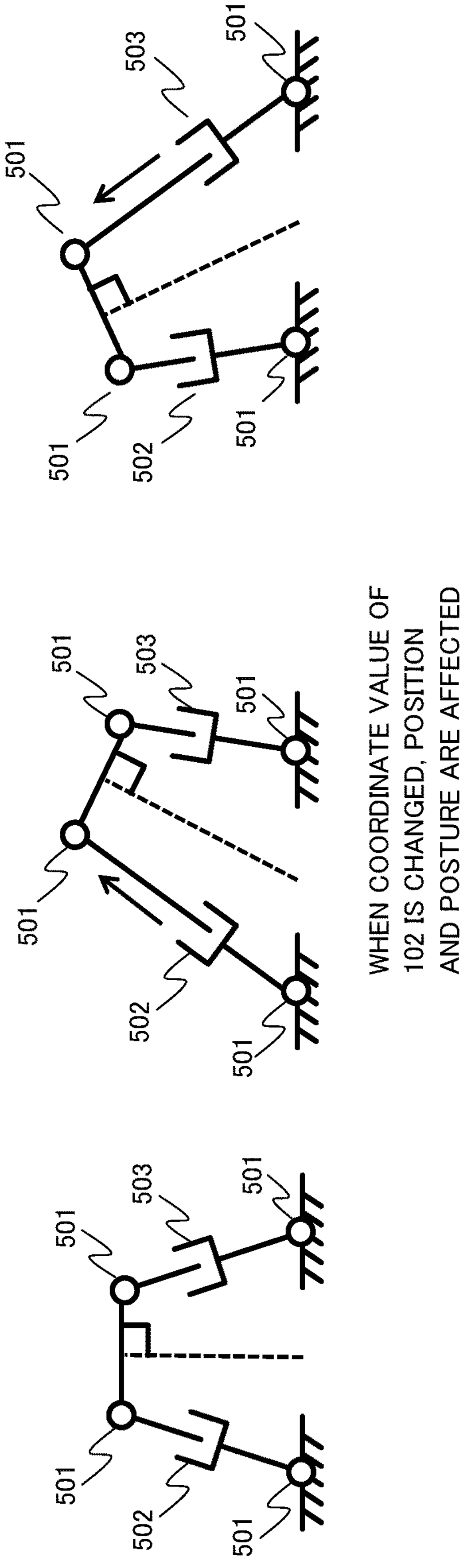
FIG. 8B is an explanatory diagram of the parent-child relationship of the components of the machine according to the present embodiment.

The method of generating the data having the data structure in the shape of the machine configuration tree described above is used, and thus it is possible to set a parent-child relationship of the constituent elements of the machine. Here, the parent-child relationship refers to a relationship in which, for example, when as shown in FIG. 8A, two rotary axis nodes 504 and 505 are present, a variation in the coordinate value of the node 504 on one side unilaterally affects the geometric state (typically, the position and the posture) of the node 505 on the other side. In this case, the nodes 504 and 505 are said to have a parent-child relationship, the node 504 is referred to as a parent and the node 505 is referred to as a child. However, for example, as shown in FIG. 8B, in a machine configuration that is configured with two linear axis nodes 502 and 503 and four free joints 501, a mechanism is present in which as the coordinate value (length) of one of the nodes 502 and 503 is varied, not only the geometric state of the other node but also the geometric state of itself is varied, that is, the nodes affect each other. In such a case, both of them are parents and children, and in other words, the parent-child relationship can be regarded as being bidirectional.

Figure 9A:
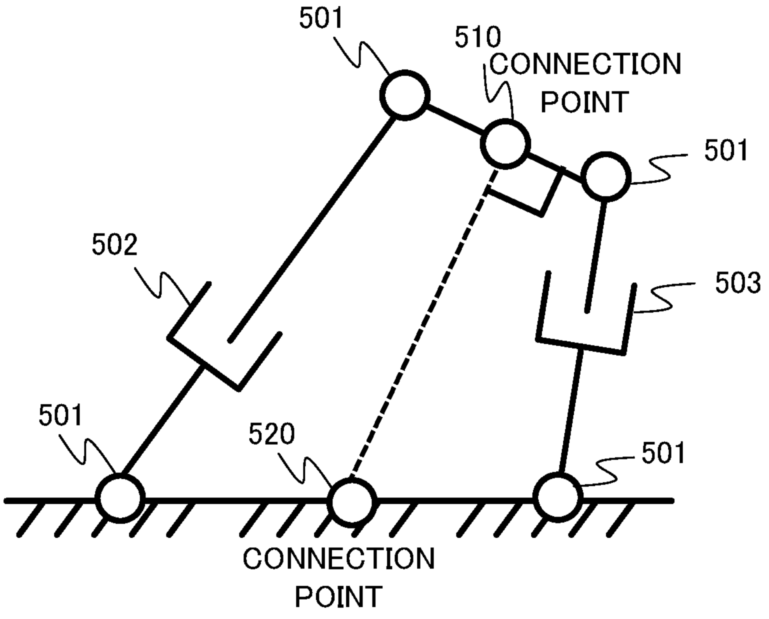
FIG. 9A is an explanatory diagram of a method of inserting a unit into a machine configuration tree.
Figure 9B:
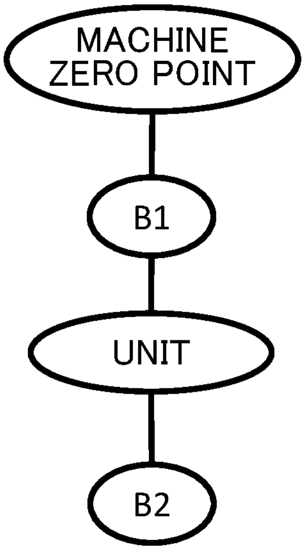
FIG. 9B is an explanatory diagram of a method of inserting a unit into a machine configuration tree.
Figure 9C:
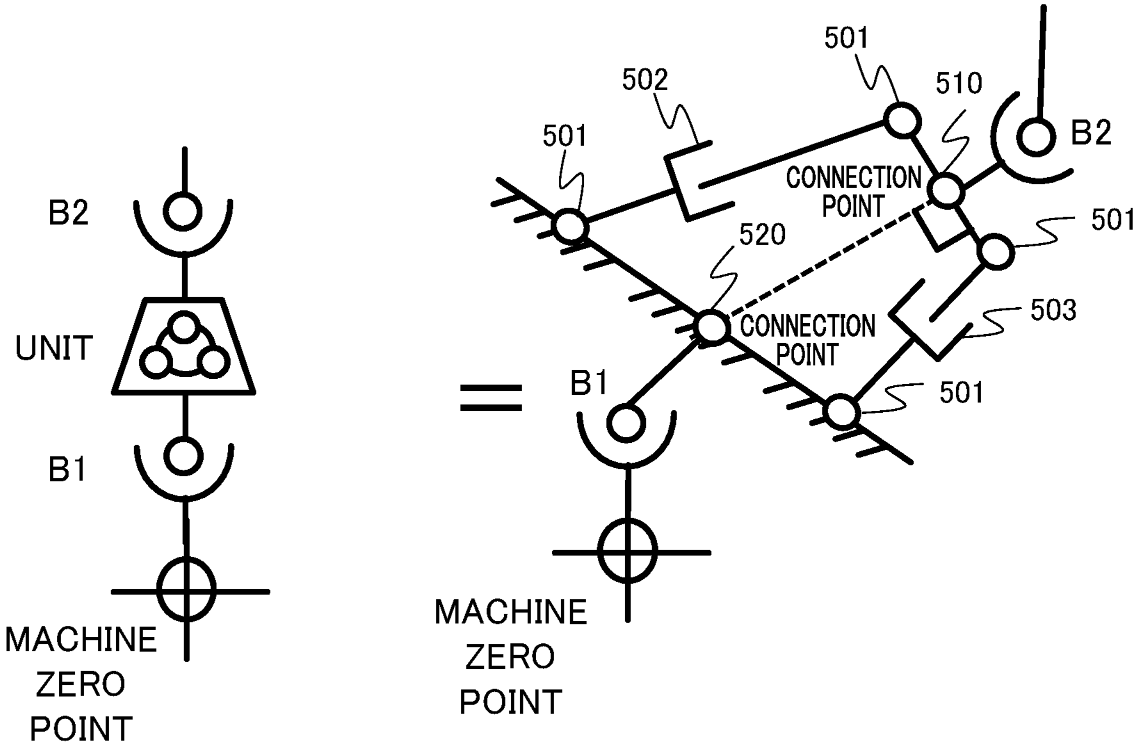
FIG. 9C is an explanatory diagram of a method of inserting a unit into a machine configuration tree.
Figure 10:
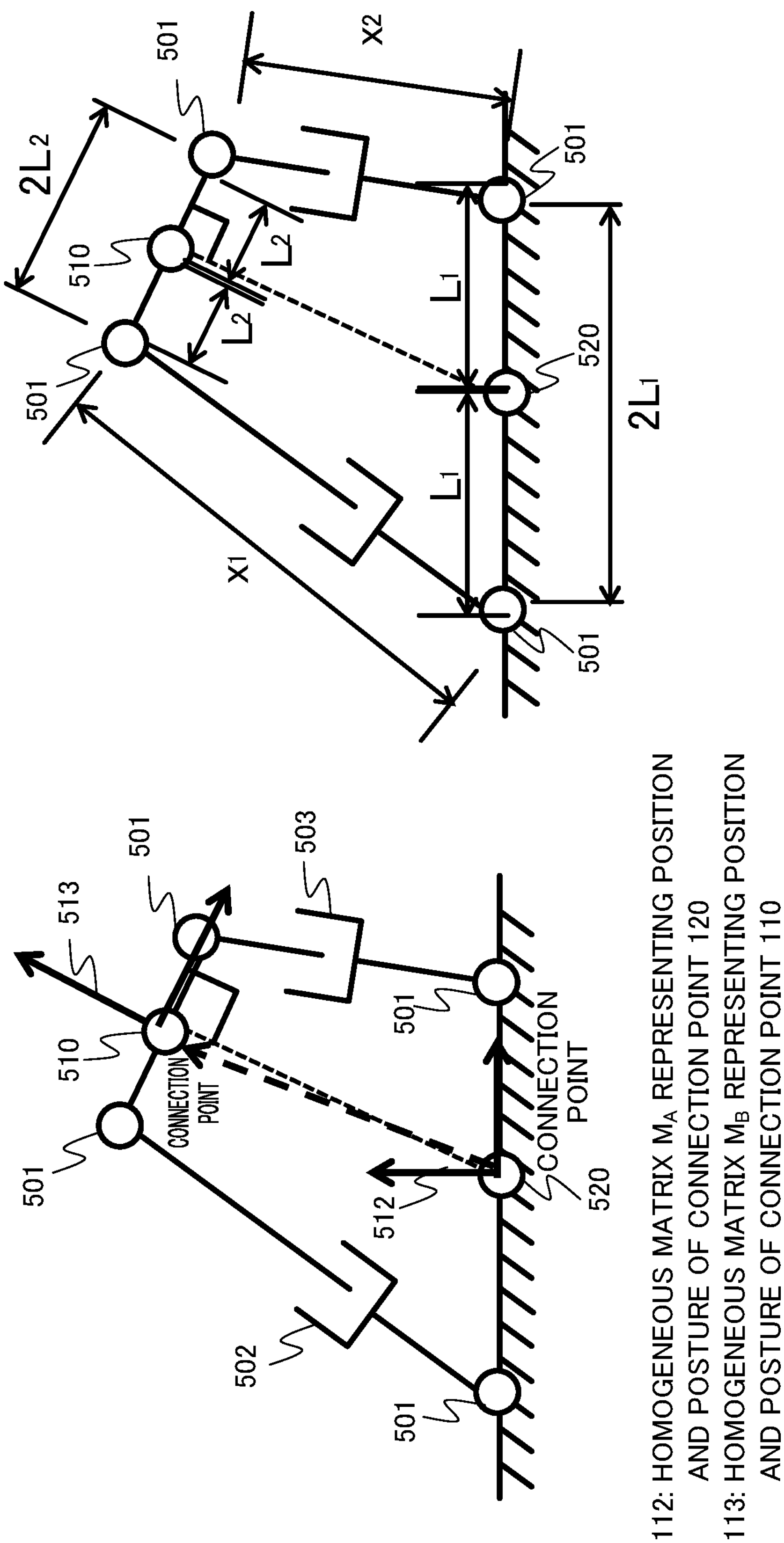
FIG. 10 is a diagram showing an example of a machine configuration according to an embodiment of the present invention.

As described above, a mechanism in which a variation in a certain node affects the other node is regarded as one unit in terms of convenience, this unit is inserted into the machine configuration tree and thus the entire machine configuration tree is generated. As shown in FIG. 9A, the unit has two connection points 510 and 520, and when the unit is inserted into the machine configuration tree as shown in FIG. 9B, as shown in FIG. 9C, the parent node is connected to the connection point 520, and the child node is connected to the connection point 510. The unit also has a transformation matrix from the connection point 520 to the connection point 510. This transformation matrix is indicated by the coordinate values of the individual nodes included in the unit. For example, in the case of a machine configuration as shown in FIG. 10, when a homogeneous matrix indicating the position and the posture of the connection point 520 is assumed to be $M_A$, and a homogeneous matrix indicating the position and the posture of the connection point 510 is assumed to be $M_B$, a transformation formula between the matrices is represented as follows by use of the coordinate values $x_1$ and $x_2$ of the linear axis nodes included in the unit.

[Formula 1]

$$\text{When it is assumed } \theta = \sin^{-1}\left(\frac{x_1^2 - x_2^2}{4L_1L_2}\right)$$

$$L = L_1\cos\theta + \sqrt{0.5x_1^2 + 0.5x_2^2 - L_2^2 - L_1^2\sin^2\theta}$$

$$\text{the formula is represented } M_B =$$

$$TM_A \text{ where } T = \begin{pmatrix} \sin\theta & 0 & \cos\theta & L\cos\theta \\ 0 & 1 & 0 & 0 \\ -\cos\theta & 0 & \sin\theta & L\sin\theta \\ 0 & 0 & 0 & 1 \end{pmatrix}$$

The unit indicating this machine configuration has a homogeneous transformation matrix such as T in the mathematical formula of [Formula 1] described above. The homogeneous matrix refers to a 4×4 matrix which can collectively represent the position and the posture as in the mathematical formula of [Formula 2] below.

[Formula 2]

$$\begin{pmatrix} \overbrace{\begin{matrix} \cos\theta & -\sin\theta & 0 \\ \sin\theta & \cos\theta & 0 \\ 0 & 0 & 1 \end{matrix}}^{posture} & \overbrace{\begin{matrix} x \\ y \\ z \end{matrix}}^{position} \\ \begin{matrix} 0 & 0 & 0 \end{matrix} & 1 \end{pmatrix}$$

Even when the parent-child relationship is not mutual, in order for calculation processing or a setting to be simplified, a unit in which a plurality of nodes are previously integrated into one may be defined and configured into the machine configuration tree.

As described above, in the present embodiment, the graph of the machine configuration can include, as a constituent element, a unit in which a plurality of axes are integrated into one.

4. Automatic Insertion of Control Point and Coordinate System

In order to specify, as the control points, various positions on the machine configuration and set coordinate systems in various places on the machine configuration, the following method is performed by use of the machine configuration tree generated in "3. Generation of machine configuration tree" described above.

Figure 11A:
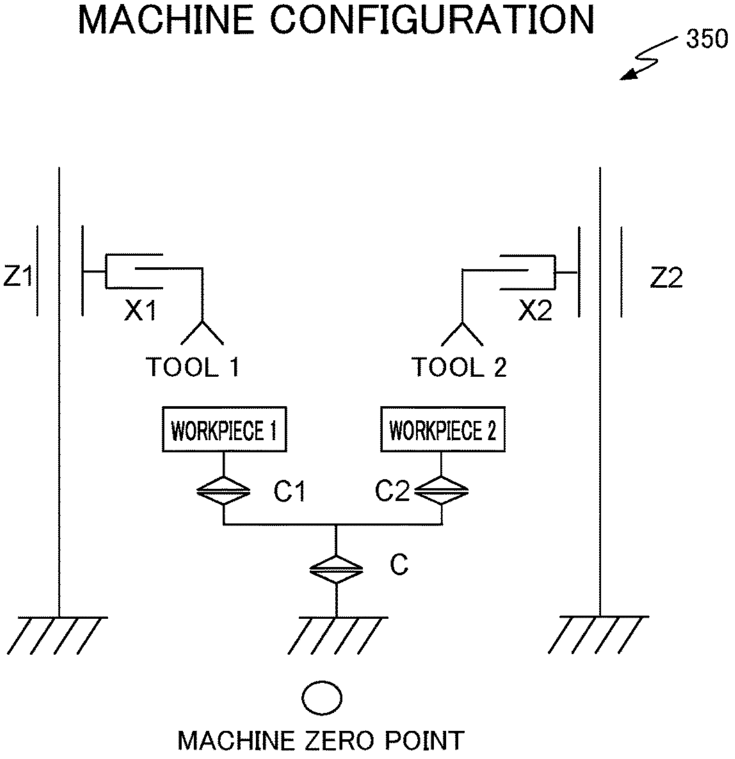
FIG. 11A is a diagram showing an example of a machine which is a target for the generation of the machine configuration tree.
Figure 11B:
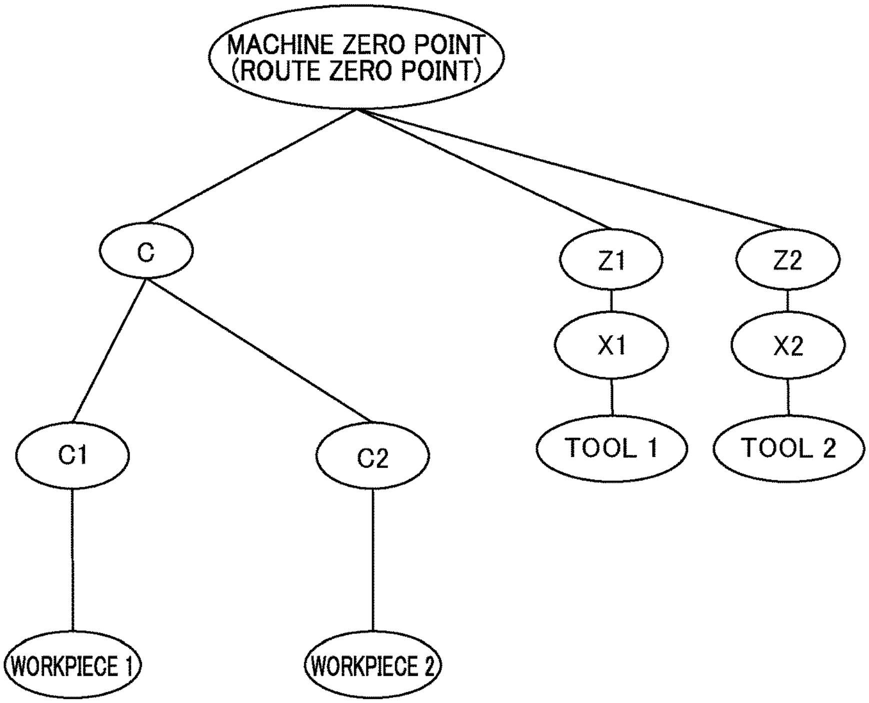
FIG. 11B is a diagram showing an example of the machine configuration tree corresponding to the machine which is the target for the generation of the machine configuration tree.

For example, in a rotary index machine 350 shown in FIG. 11A, an X1 axis is set perpendicular to a Z1 axis, and a tool 1 is installed in the X1 axis. An X2 axis is set perpendicular to a Z2 axis, and a tool 2 is installed on the X2 axis. Furthermore, it is assumed that in a table, on a C axis, a C1 axis and a C2 axis are set in parallel, and in the C1 axis and the C2 axis, a workpiece 1 and a workpiece 2 are respectively installed. When this machine configuration is represented by a machine configuration tree, the machine configuration tree shown in FIG. 11B is provided.

Figure 12:
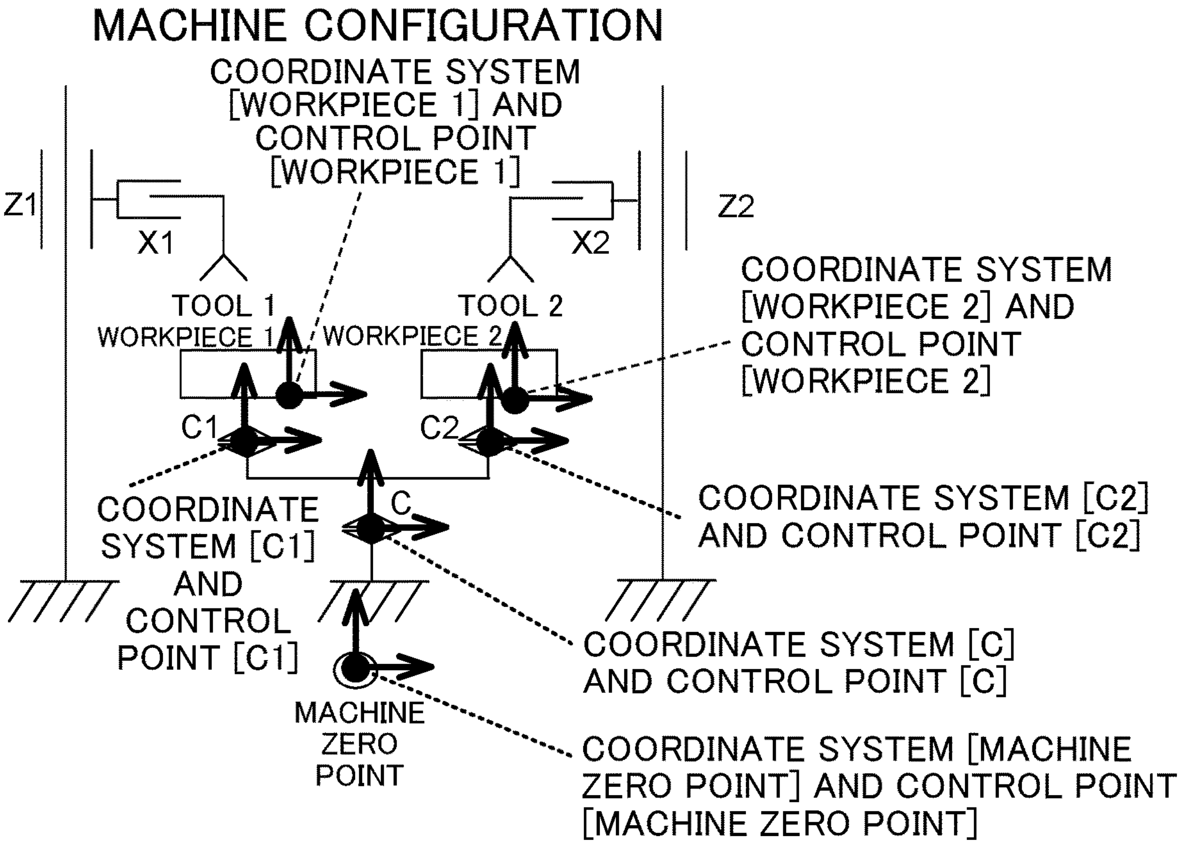
FIG. 12 is a diagram showing an example in which coordinate systems and control points are inserted into each node of the machine.
Figure 13:
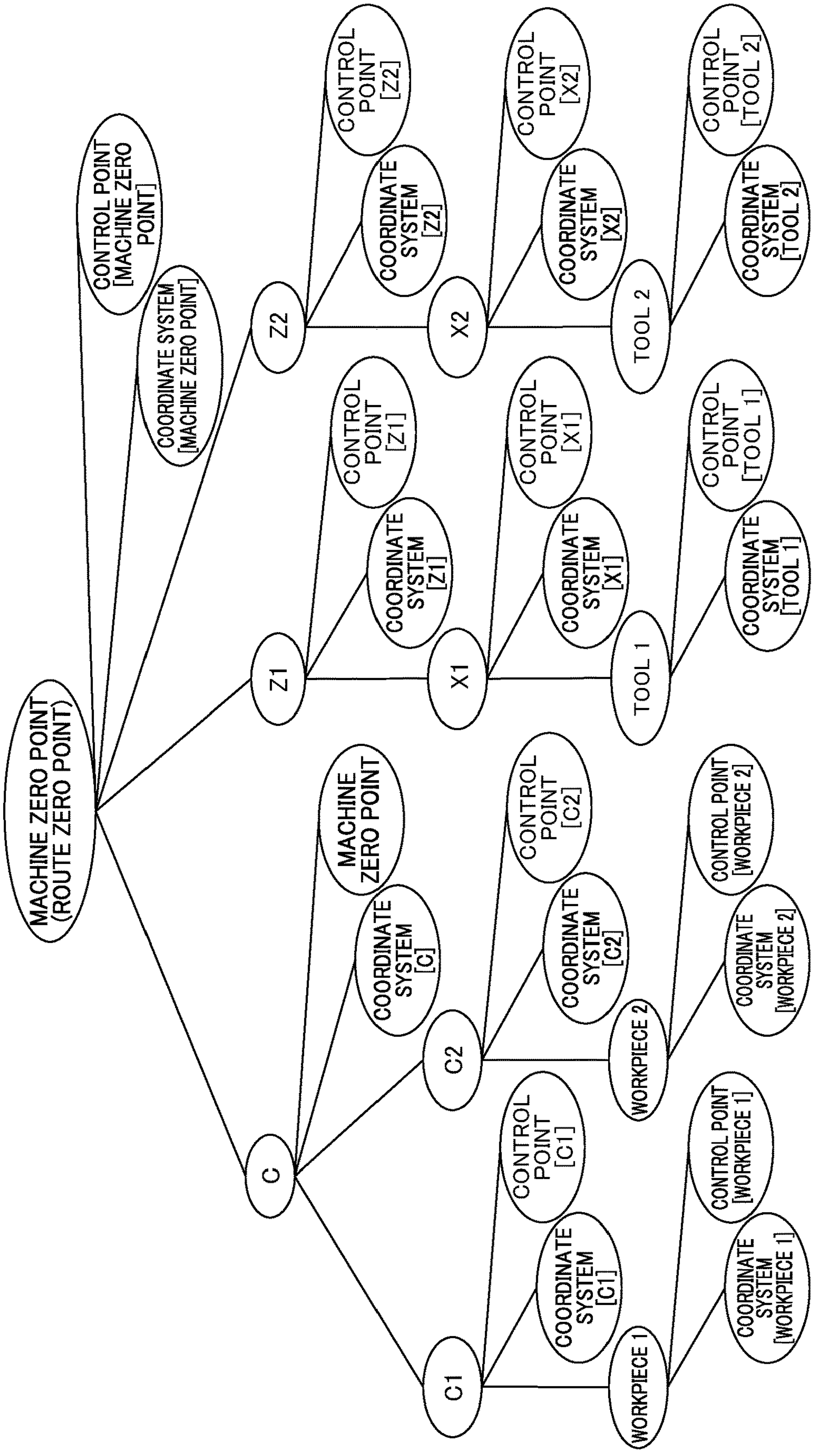
FIG. 13 is a diagram showing an example of the machine configuration tree in which coordinate systems and control points are inserted.

In an example of a series of nodes leading from individual workpieces to the machine zero point, as shown in FIG. 12, a coordinate system and a control point are automatically inserted into each of the machine zero point, the C axis, the C1 axis, the C2 axis, the workpiece 1 and the workpiece 2. This is performed not only on the table but also on the series of nodes leading from individual tools to the machine zero point, that is, all the X1 axis, the X2 axis, the Z1 axis, the Z2 axis, the tool 1 and the tool 2. Consequently, as shown in FIG. 13, into all the nodes of the machine configuration tree, the control points and the coordinate systems corresponding to the individual nodes are automatically inserted. Normally, when machining is performed, the coordinate system is specified in the workpiece, and the tool is specified as the control point. In this way, for example, it is possible to cope with various cases such as a case where in order to move a workpiece itself to a predetermined position, the control point is desired to be specified in the workpiece and a case where in order to use a certain tool to polish another tool, the coordinate system is desired to be set in the tool itself.

Figure 14A:
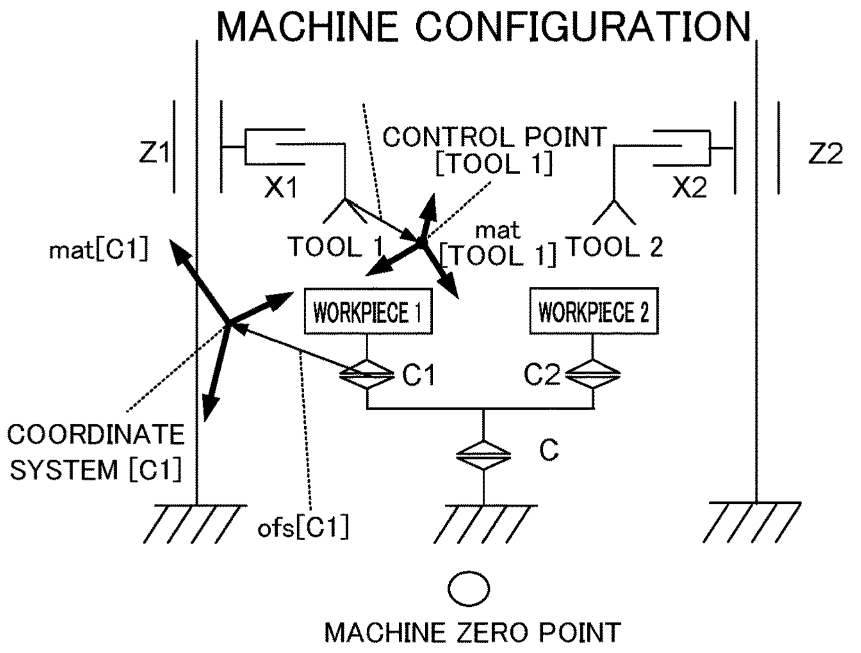
FIG. 14A shows an example of a machine in which an offset and a posture matrix are inserted into each node.
Figure 14B:
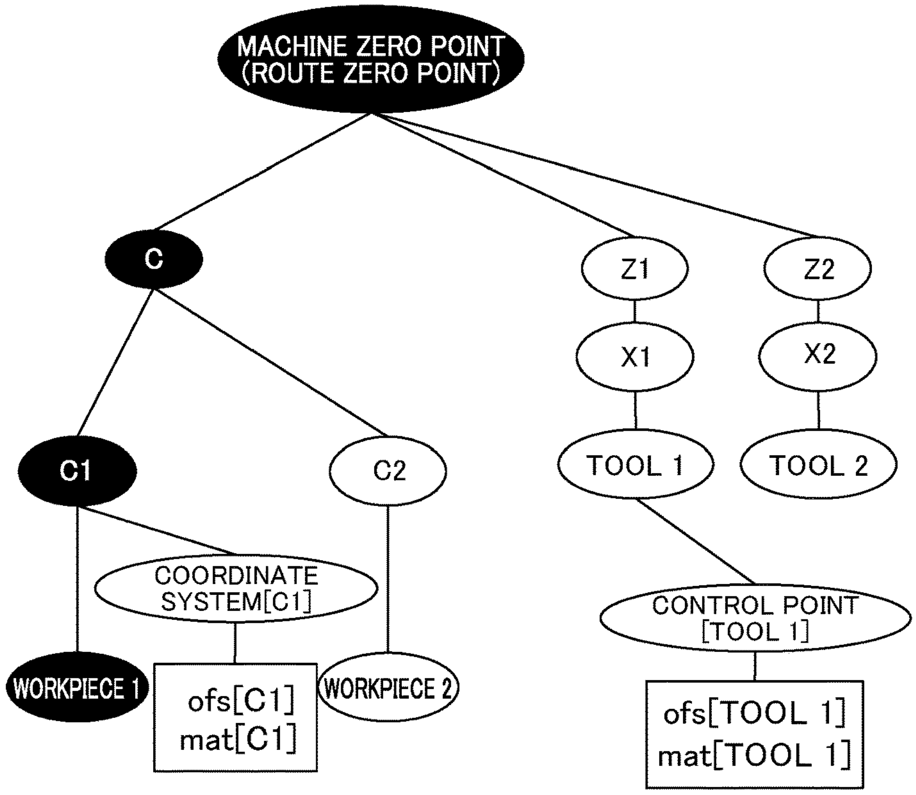
FIG. 14B shows an example in which an offset and a posture matrix are inserted in each node of the machine.

As shown in FIG. 14A, each of the control points and the coordinate systems has an offset. Hence, a point away from the center of the node can be set to a control point or a coordinate system zero point. Furthermore, each of the control points and the coordinate systems has a posture matrix. When this posture matrix is the posture matrix of the control point, it indicates the posture (the direction, the inclination) of the control point whereas when this posture matrix is the posture matrix of the coordinate system, it indicates the posture of the coordinate system. In a machine configuration tree shown in FIG. 14B, the offset and the posture matrix are represented so as to be associated with the nodes corresponding thereto. Furthermore, each of the control points and the coordinate systems has information on whether or not the "move" and the "cross-offset" of the node present on a path up to the route of the machine configuration tree are individually added, and the information can be set.

Figure 15:
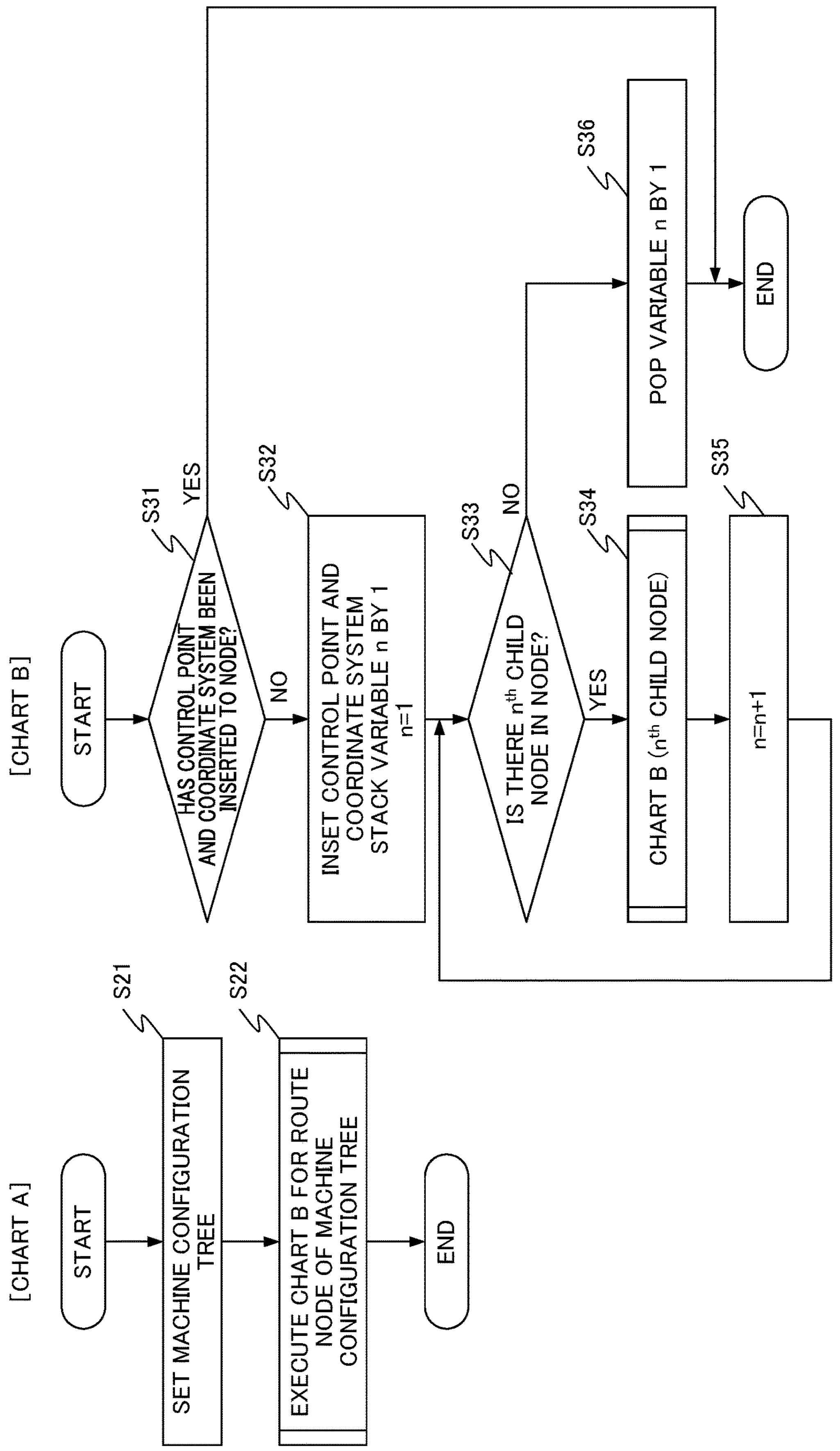
FIG. 15 is a diagram showing an operation flow of inserting the control point into the machine configuration tree.

A flowchart obtained by generalizing the method of automatically inserting the control point described above is shown in FIG. 15. Specifically, this flowchart includes a chart A and a chart B, and as will be described later, the chart B is performed in the middle of the chart A.

The chart A will first be described. In Step S21, the graph generation unit 105 sets a machine configuration tree. In Step S22, the chart B is performed, and the flow of the chart A is completed.

The chart B will then be described. In Step S31 of the chart B, when the control point and the coordinate system have been inserted into the node (yes in S31), the flow is completed. When the control point and the coordinate system have not been inserted into the node (no in S31), the processing is transferred to Step S32.

In Step S32, the control point coordinate system insertion unit 106 inserts the control point and the coordinate system into the node, and stacks a variable n by 1. A setting is made such that n=1.

In Step S33, when the $n^{th}$ child node is present in the node (yes in S33), the processing is transferred to Step S34. When the $n^{th}$ child node is not present in the node (no in S33), the processing is transferred to Step S36.

In Step S34, on the $n^{th}$ child node, the chart B itself is performed in a recursive manner.

In Step S35, n is incremented by 1. In other words, the increment is performed such that n=n+1, and the processing is returned to Step S33.

In Step S36, the variable n is popped by 1, and the flow of the chart B is completed.

Figure 16:
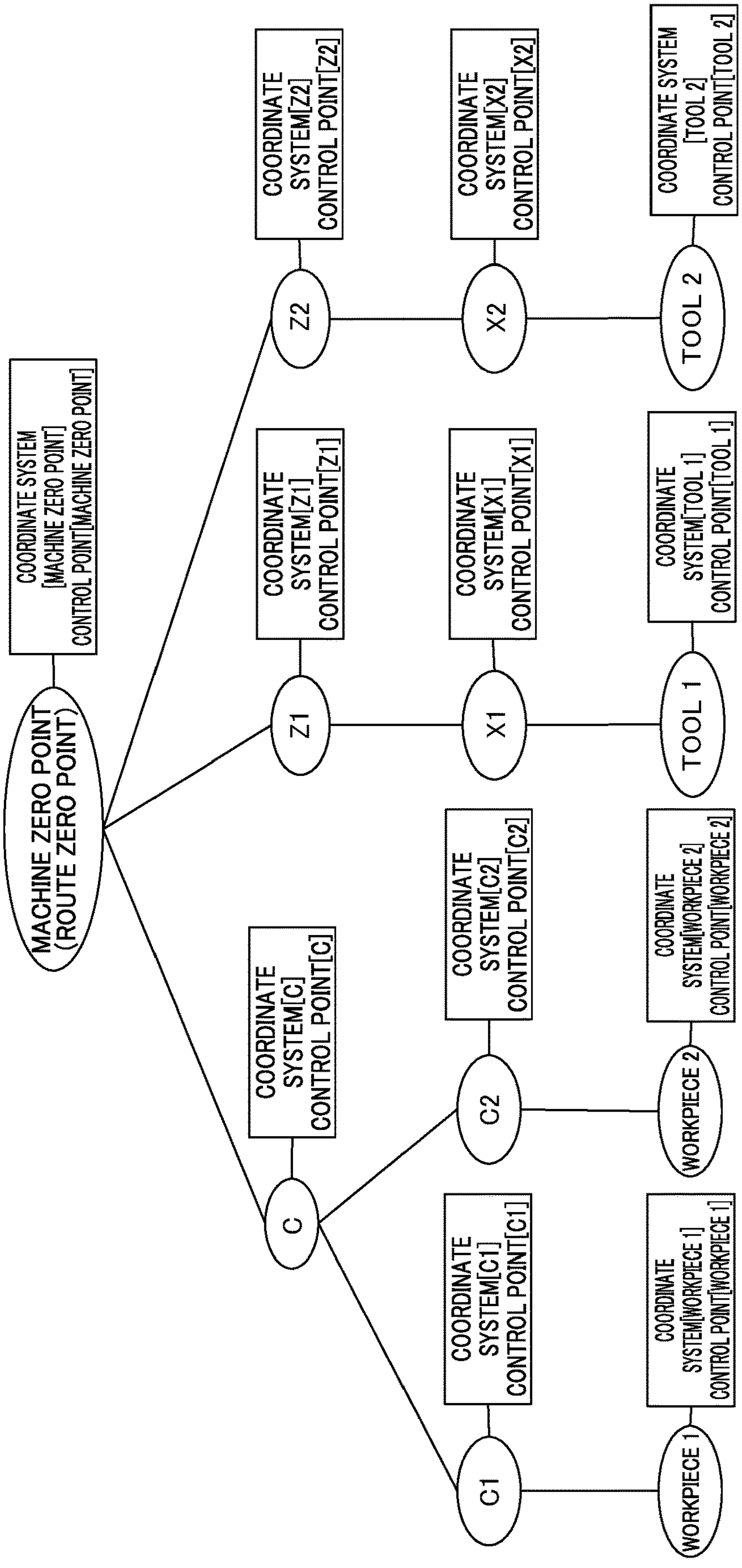
FIG. 16 is a diagram showing an example of the machine configuration tree in which the coordinate systems and the control points are inserted.

By the method described above, the control point coordinate system insertion unit 106 inserts, as nodes, the control points and the coordinate systems into the individual nodes of the graph in the machine configuration. Although in the above description, the example where the control points and the coordinate systems are added as nodes is described, an embodiment is also possible in which as shown in FIG. 16, the control point coordinate system insertion unit 106 makes the individual nodes of the graph in the machine configuration have the control points and the coordinate systems as information.

5. Processing Flow of Control Device

Figure 17:
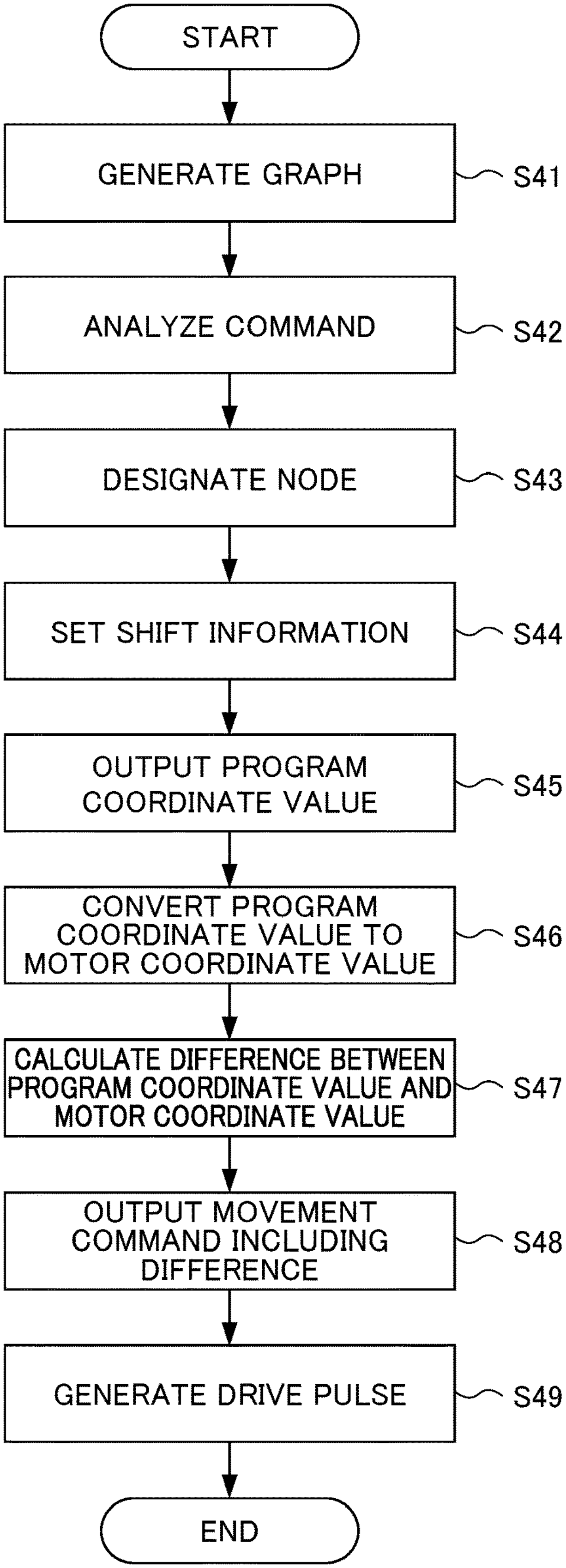
FIG. 17 is a flowchart showing processing of the control device according to the present embodiment.

FIG. 17 is a flowchart showing processing of the control device 10 according to the present embodiment. In Step S41, the graph generation unit 105 generates the machine configuration tree 121 indicating the machine configuration of the machine tool 20 and/or the robot 30. Further, the control point coordinate system insertion unit 106 inserts the control point and the coordinate system into the graph of the machine configuration.

In Step S42, the command analysis unit 101 analyzes a command including a machining program for machining a workpiece, and converts the command into an execution format. The command analysis unit 101 outputs the analysis result including the program coordinate value to the interpolation unit 102.

In Step S43, the shift addition node designation unit 107 designates any node in the graph in order to add the shift information including the externally inputted external movement amount to the node of the graph generated by the graph generation unit 105.

In Step S44, the shift information setting unit 108 sets the shift information for the position offset and/or the posture offset of the node designated by the shift addition node designation unit 107 based on the shift information.

In Step S45, the interpolation unit 102 performs interpolation processing on the analysis result analyzed by the command analysis unit 101. Further, the interpolation unit 102 outputs program coordinate values included in the analysis result to the kinematics conversion unit 109.

In Step S46, the kinematics conversion unit 109 converts the program coordinate value into a motor coordinate value based on the program coordinate value outputted from the interpolation unit 102 and the position offset and/or posture offset set in the node. Further, the kinematics conversion unit 109 outputs the converted motor coordinate value to the interpolation unit 102.

In Step S47, the interpolation unit 102 receives the motor coordinate value outputted from the kinematics conversion unit 109, and calculates a difference between the starting point and the ending point of the motor coordinate value.

In Step S48, the interpolation unit 102 transmits a movement command including the calculated difference to the pulse generation unit 103.

In Step S49, the pulse generation unit 103 generates drive pulses for operating each axis of the machine tool 20 and/or the robot 30 based on the movement command generated by the interpolation unit 102. Thereafter, the servo control unit 104 rotates the motors of the respective axes in accordance with the drive pulses sent from the pulse generation unit 103. With such a configuration, it is possible for the control device 10 to rotate the motors of the respective axes of the machine tool 20 and/or the robot 30 in a state where the external movement amount is added.

According to the present embodiment, the control device 10 includes: the command analysis unit 101 that analyzes a command including a machining program for machining a workpiece and outputs an analysis result including a program coordinate value; the interpolation unit 102 that performs interpolation processing on the analysis result analyzed by the command analysis unit 101 and generates a movement command of each axis of the machine tool 20 and/or the robot 30; the pulse generation unit 103 that generates a drive pulse for driving the each axis based on the movement command; the graph generation unit 105 that generates a graph indicating a machine configuration of the machine tool 20 and/or the robot 30; the shift addition node designation unit 107 that designates any node of the graphs, in order to add, to a node of the graph, shift information including an external movement amount externally inputted; the shift information setting unit 108 that sets the shift information for a position offset and/or posture offset of the designated node based on the shift information; and the kinematics conversion unit 109 that converts a program coordinate value included in the movement command to a motor coordinate value based on the position offset and/or the posture offset set in the node.

Thus, the control device 10 can shift the path of automatic operation (for example, the tool movement path) with respect to any coordinate system on the machine configuration of the machine tool 20 and/or the robot 30 without increasing the calculation load of the interpolation processing.

6. Control of Five-Axis Milling Machine

Figure 18:
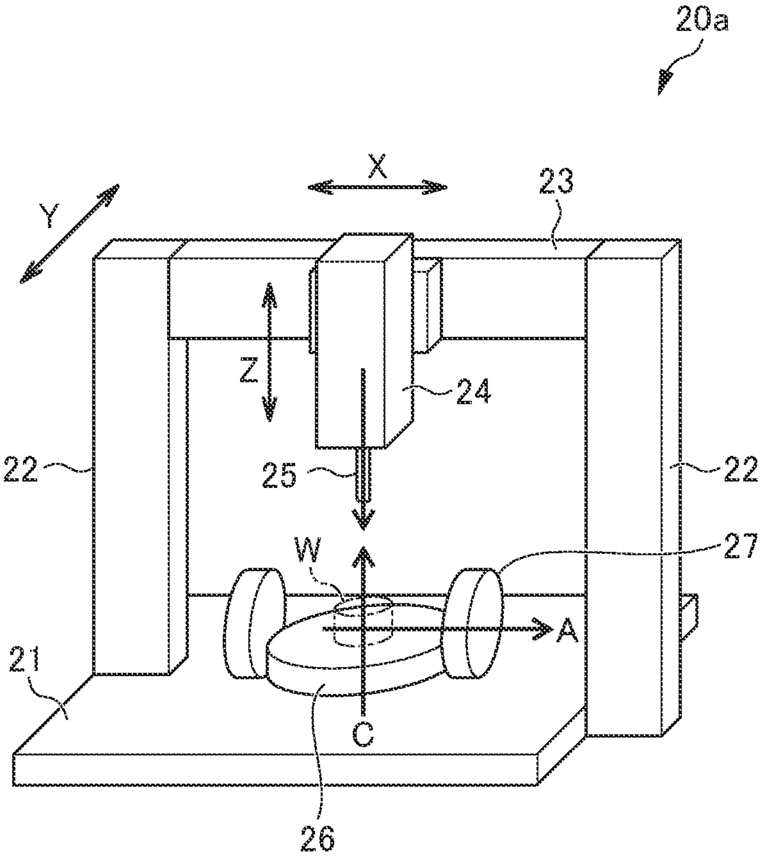
FIG. 18 is a perspective view showing a five-axis milling machine as an example of a machine tool controlled by the control device according to the present embodiment.
Figure 19:
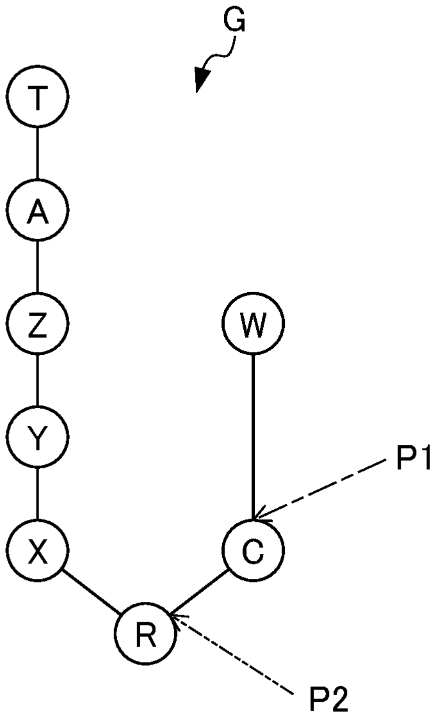
FIG. 19 is a diagram showing a machine configuration tree indicating a configuration of a machine of a five-axis milling machine.

FIG. 18 is a perspective view showing a five-axis milling machine 20*a* as an example of the machine tool 20 controlled by the control device 10 according to the present embodiment. FIG. 19 is a diagram showing a machine configuration tree G indicating the configuration of the machine of the five-axis milling machine 20*a*.

The five-axis milling machine 20*a* includes a bed 21, a pair of column portions 22, 22 erected on the bed 21, and a rail portion 23 which connects upper end portions of the column portions 22, 22 to each other and extends in the lateral direction. A tool head 24 is attached to the rail portion 23.

The five-axis milling machine 20*a* has, as linear axes, an X-axis along the surface direction of the bed 21 and along the length direction of the rail portion 23, a Y-axis along the surface direction of the bed 21 and orthogonal to the length direction of the rail portion 23, and a Z-axis perpendicular to the surface direction of the bed 21. The tool head 24 is provided so as to be linearly movable along the three axes of the X-axis, the Y-axis, and the Z-axis. At the lower end of the tool head 24, a tool 25 serving as a moving shaft member projects downward along the Z-axis direction.

On the bed 21 of the five-axis milling machine 20*a*, a mounting portion 26 for mounting a workpiece W to be machined and rotating the workpiece W around the C-axis, and a turntable 27 for rotating the mounting portion 26 around the A-axis along the X-axis direction are provided. The C-axis is disposed parallel to the Z-axis direction when the mounting portion 26 is disposed perpendicular to the Z-axis (when the rotation angle of the turntable 27 is 0°). The two axes of the A-axis and the C-axis in the five-axis milling machine 20*a* are disposed adjacent to the workpiece W, and are rotary axes that determine tool directions, which are relative directions of the tool 25 with respect to the workpiece W by rotation.

The machine configuration tree G indicating the configuration of the machine of the five-axis milling machine 20*a* is generated by the graph generation unit 105 as a graph as shown in FIG. 19. In the machine configuration tree G shown in FIG. 19, the node T indicates the tool 25, the node A indicates the A axis, the node Z indicates the Z axis, the node X indicates the X axis, the node R indicates the reference position of the machine, the node C indicates the C axis, and the node W indicates the workpiece W.

The shift information setting unit 108 of the control device 10 according to the present embodiment sets the shift information with the position P1 for the node C in such a machine configuration tree G. With such a configuration, it is possible for the control device 10 to reflect the external movement amount of the turntable 27 on the table coordinate system, thereby allowing the external movement amount to follow the rotation of the turntable 27.

Further, the shift information setting unit 108 sets the shift information with the position P2 for the node R in such a machine configuration tree G. With such a configuration, it is possible for the control device 10 to reflect the external movement amount of the five-axis milling machine 20*a* on the machine coordinate system, thereby preventing the external movement amount from following the rotation of the turntable 27.

As described above, it is possible for the control device 10 according to the present embodiment to switch which coordinate system of the machine tool 20 the external movement amount is made to follow depending on which node the position belongs that the shift information is set to. With such a configuration, it is possible for the control device 10 to realize a desired external movement amount in the machine tool 20, i.e., a desired tool tip point path.

7. Application Example 1

Hereinafter, application examples 1 to 3 to which the control device 10 according to the present embodiment is applied to the machine tool 20 and/or the robot 30 will be described. In application example 1, the control device 10 controls the five-axis milling machine 20*a* shown in FIG. 18 as the machine tool 20.

Figure 20:
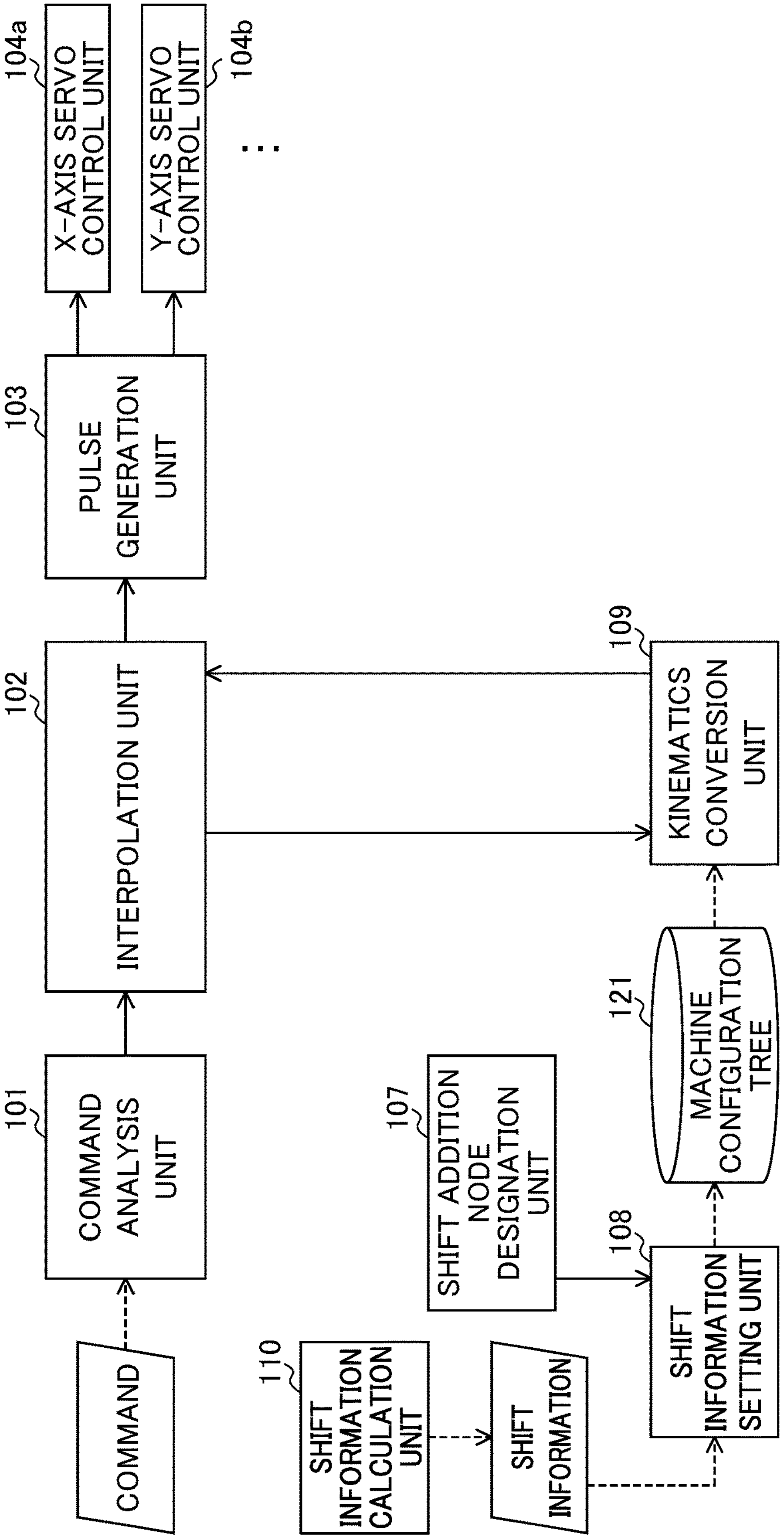
FIG. 20 is a block diagram showing a configuration of a control device in application example 1.
Figure 21:
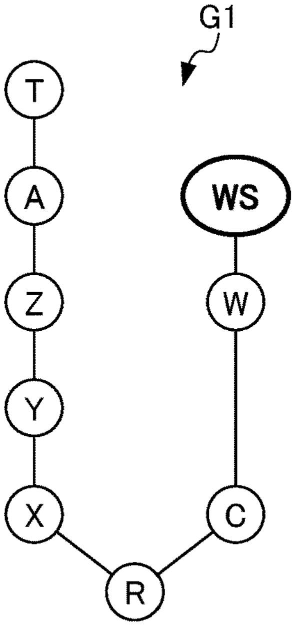
FIG. 21 is a diagram showing a machine configuration tree indicating the configuration of the machine of the five-axis milling machine according to application example 1.

FIG. 20 is a block diagram showing a configuration of the control device 10 in application example 1. FIG. 21 is a diagram showing a machine configuration tree G1 indicating the configuration of the machine of the five-axis milling machine 20*a* in application example 1.

As in FIGS. 2 and 3, the control unit 100 of the control device 10 includes a command analysis unit 101, an interpolation unit 102, a pulse generation unit 103, a servo control unit 104, a graph generation unit 105, a control point coordinate system insertion unit 106, a shift addition node designation unit 107, a shift information setting unit 108, and a kinematics conversion unit 109. Further, the control unit 100 includes a shift information calculation unit 110.

The shift information calculation unit 110 calculates shift information including an external movement amount in the program coordinate system. For example, the shift information calculation unit 110 calculates the shift information based on the motor coordinate value of the five-axis machining machine 20*a*. For example, the shift information calculation unit 110 holds the accumulated value of the interpolation pulses in the motor coordinate system outputted from the interpolation unit 102 to the pulse generation unit 103. Here, the interpolation pulse corresponds to an external movement. Further, the shift information calculation unit 110 converts the accumulated value of the interpolation pulses into a program coordinate system and sets the program coordinate system as shift information.

Then, as shown in FIG. 21, the shift addition node designation unit 107 designates a workpiece coordinate system node W indicating the workpiece coordinate system on the machine configuration tree G1. The shift information setting unit 108 sets the shift information with respect to the position offset and/or the posture offset of the leaf node WS of the workpiece coordinate system node W.

Figure 22:
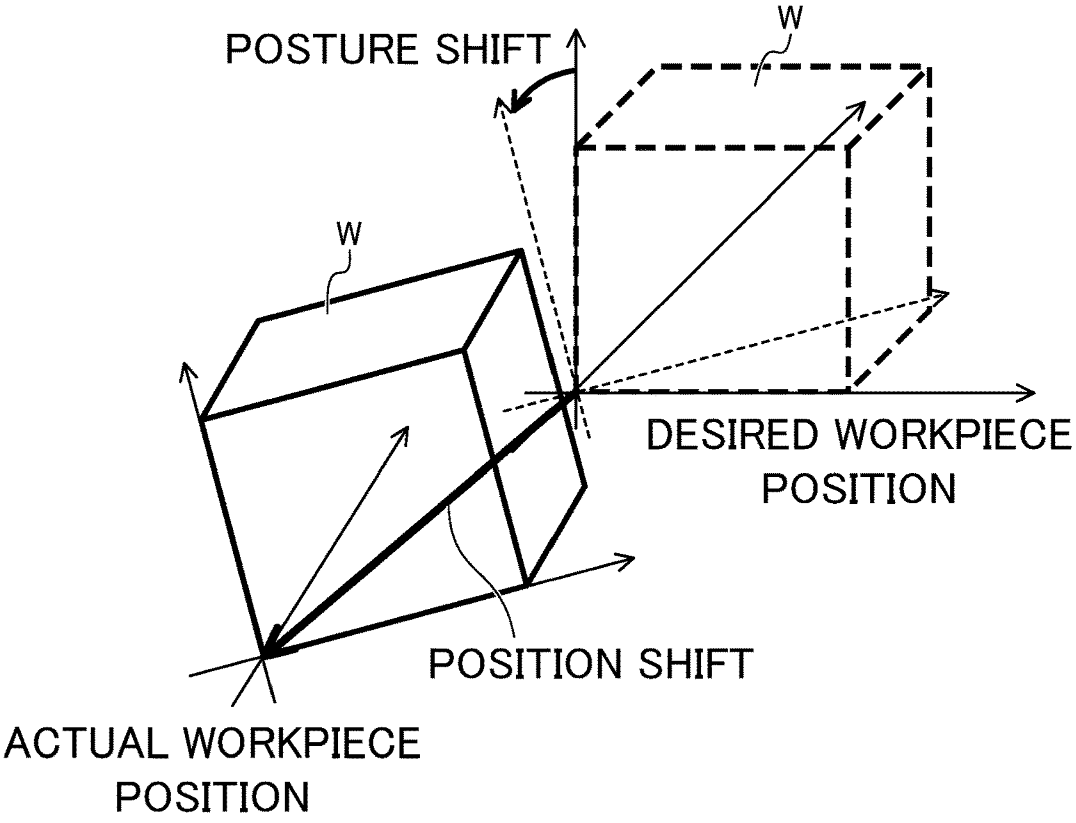
FIG. 22 is a diagram showing a relationship between an actual workpiece position and a desired workpiece position in application example 1.

FIG. 22 is a diagram showing a relationship between an actual workpiece position and a desired workpiece position in application example 1. As shown in FIG. 22, the control device 10 creates a machining program assuming that the workpiece W is at a desired workpiece position; however, the actual workpiece position is different from the desired workpiece position.

In order to consider such a difference between workpiece positions, the control device 10 according to the present embodiment sets the shift information for the position offset and/or the posture offset of the node WS as described above, and calculates the difference between the program coordinate value and the motor coordinate value. With such a configuration, it is possible for the control device 10 to perform a desired machining in the five-axis milling machine 20*a* by externally moving the workpiece by the difference between the desired workpiece position and the actual workpiece position.

8. Application Example 2

Figure 23:
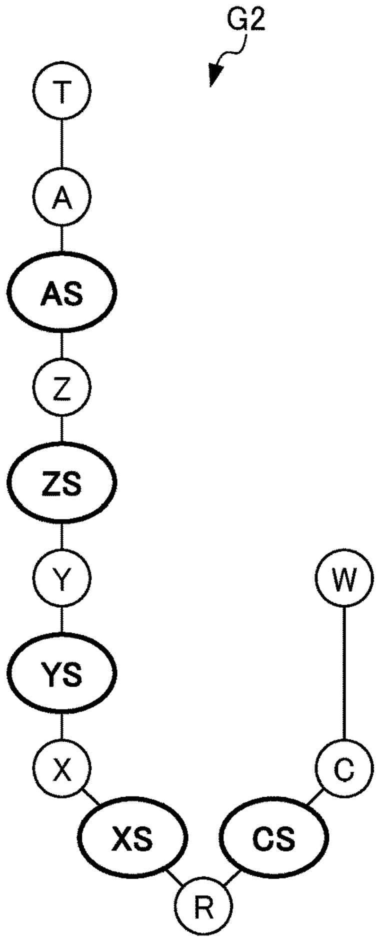
FIG. 23 is a diagram showing a machine configuration tree indicating a configuration of a machine of a five-axis milling machine according to application example 2.

FIG. 23 is a diagram showing a machine configuration tree G2 indicating the configuration of the machine of the five-axis milling machine 20*a* according to application example 2. In application example 2, the control device 10 controls the five-axis milling machine 20*a* shown in FIG. 18 as the machine tool 20.

In application example 2, the shift information refers to an external movement amount from the outside in the motor coordinate system. The shift addition node designation unit 107 designates a plurality of the motor coordinate system nodes A, Z, Y, X, and C indicating the motor coordinate system of each axis in the machine configuration tree G2. The shift information setting unit 108 sets the shift information for the plurality of position offsets and/or posture offsets of a root node AS of the node A, a root node ZS of the node Z, a root node YS of the node Y, a root node XS of the node X, and a root node CS of the node C in the motor coordinate system.

Figure 24:
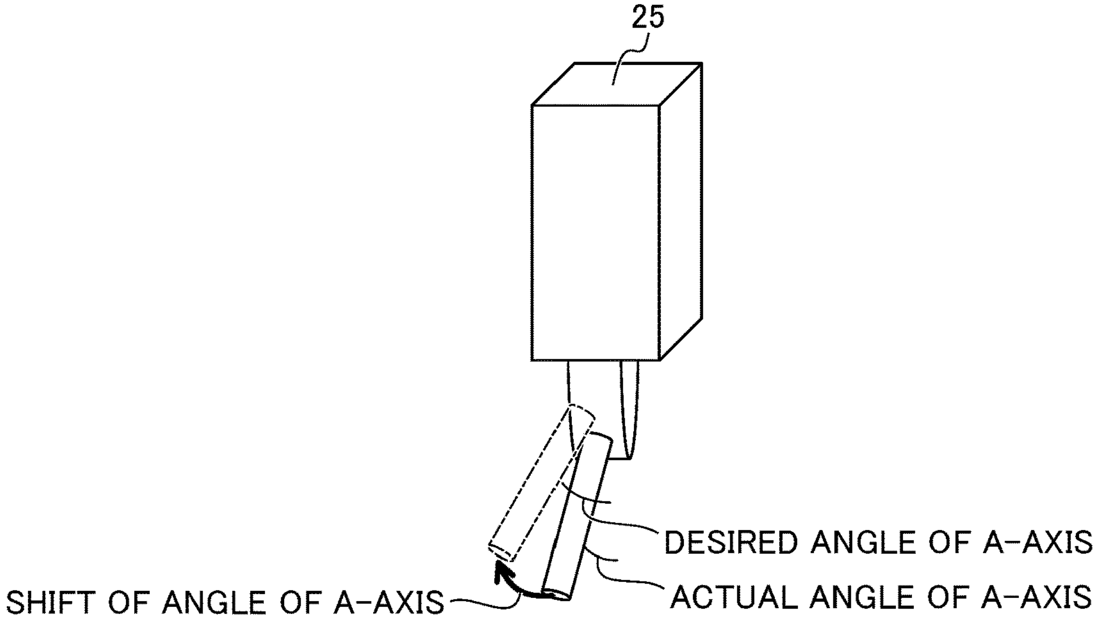
FIG. 24 is a diagram showing a relationship between an actual angle of the A-axis and a desired angle of the A-axis in application example 2.

FIG. 24 is a diagram showing a relationship between an actual angle of the A-axis and a desired angle of the A-axis in application example 2. As shown in FIG. 24, there may be a difference between a desired angle of the A-axis commanded by the machining program and an actual angle of the A-axis.

In order to consider the difference between the angles of the A-axis, the control device 10 according to the present embodiment sets the shift information for the position offset and/or the posture offset of the root node AS of the motor coordinate system node A as described above, and calculates the difference between the program coordinate value and the motor coordinate value. With such a configuration, it is possible for the control device 10 to execute the machining program using a desired tool direction in the five-axis milling machine 20*a* by externally moving the difference between the desired angle of the A-axis and the actual angle of the A-axis.

9. Application Example 3

Figure 25:
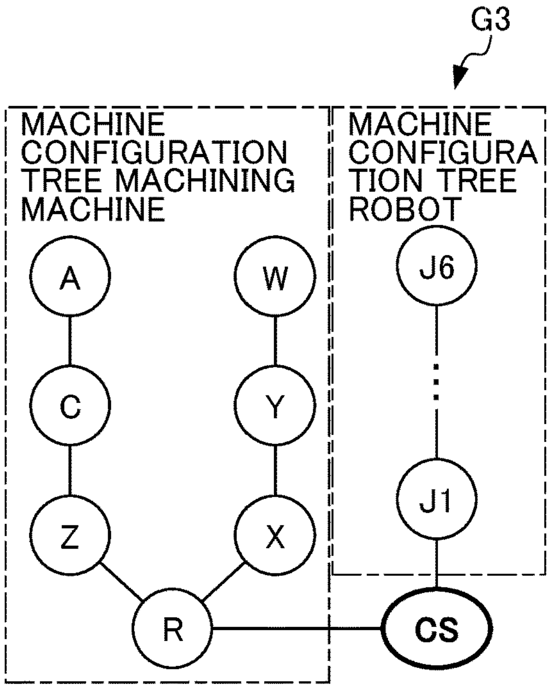
FIG. 25 is a diagram showing a machine configuration tree G3 indicating the configuration of machine tools and robots according to application example 3.
Figure 26:
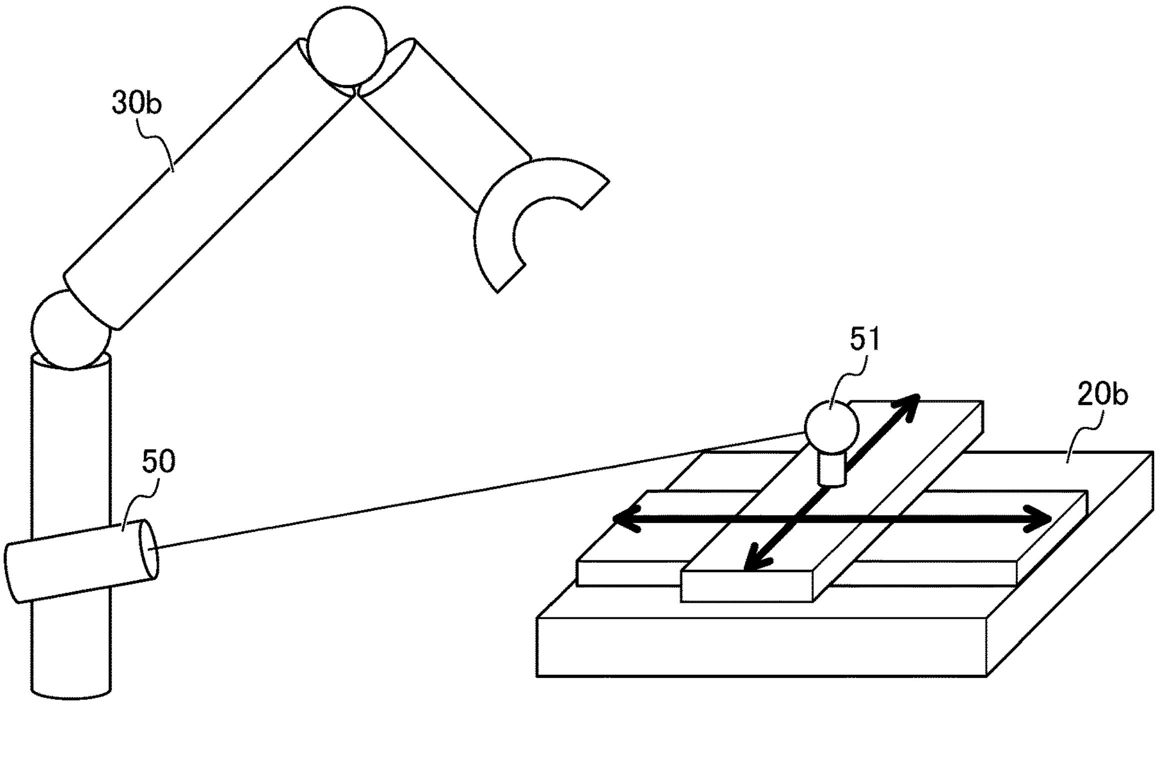
FIG. 26 is a diagram showing a positional relationship between a machine tool and a robot in application example 3.

FIG. 25 is a diagram showing a machine configuration tree G3 indicating the configuration of a machine tool 20*b* and a robot 30*b* according to application example 3. FIG. 26 is a diagram showing a positional relationship between the machine tool 20*b* and the robot 30*b* in application example 3. As shown in FIG. 25, the machine configuration tree G3 includes nodes A, C, Z, R, X, Y, and W as the machine configuration of the machine tool 20*b*. Further, the machine configuration of the robot 30*b* includes nodes J1, J2, J3, J4, J5, and J6. Then, the shift addition node designation unit 107 designates the world coordinate system node CS on the machine configuration tree G3. The shift information setting unit 108 sets the shift information for the offset and/or posture offset of the node CS.

As shown in FIG. 26, in application example 3, the shift information includes an external movement amount indicating a positional difference between the machine tool 20 and the robot 30 measured by the measuring device 50. Here, the measuring device 50 includes a laser tracker, a stereo camera, and the like.

In this way, when the external movement amount is given based on the measurement result of the external measuring device 50, it can be easily determined that the external movement amount should be maintained in the world coordinate system. In such a case, it is not necessary for an operator to consciously designate the additional shift node.

Although the embodiments of the present invention have been described above, the above-described control device 10 can be implemented by hardware, software, or a combination thereof. The control method performed by the control device 10 can also be implemented by hardware, software, or a combination thereof. Here, "implemented by software" means that it is realized by a computer reading and executing a program.

The program may be stored and provided to a computer using various types of non-transitory computer-readable media (non-transitory computer readable medium). Non-transitory computer-readable media includes various types of tangible storage media. Examples of non-transitory computer-readable media include magnetic recording media (e.g., hard disk drives), magneto-optical recording media (e.g., magneto-optical disks), CD-ROM (Read Only Memory), CD-Rs, CD-R/W, semiconductor memory (for example, mask ROM, PROM (Programmable ROM), EPROM (Erasable PROM), flash ROM, and RAM (random access memory)).

Although the above-described embodiments are preferred embodiments of the present invention, the scope of the present invention is not limited to the above-described embodiments, and various modifications can be made without departing from the gist of the present invention.

EXPLANATION OF REFERENCE NUMERALS

1 control system
10 control device
20 machine tool
30 robot
101 command analysis unit
102 interpolation unit
103 pulse generation unit
104 servo control unit
105 graph generation unit
106 control point coordinate system insertion unit
107 shift addition node designation unit
108 shift information setting unit
109 kinematics conversion unit

The invention claimed is:

1. A control device comprising:

a command analysis unit that analyzes a command including a machining program for machining a workpiece, and outputs an analysis result including a program coordinate value;

an interpolation unit that performs interpolation processing on the analysis result analyzed by the command analysis unit, and generates a movement command of respective axes of a machine tool and/or a robot;

a pulse generation unit that generates a drive pulse for driving respective axes based on the movement command;

a graph generation unit that generates a graph indicating a machine configuration of the machine tool and/or the robot;

a shift addition node designation unit that designates any node of the graph, in order to add, to a node of the graph, shift information including an external movement amount externally inputted;

a shift information setting unit that sets the shift information for a position offset and/or posture offset of the designated node based on the shift information; and a kinematics conversion unit that converts a program coordinate value included in the movement command to a motor coordinate value based on the position offset and/or the posture offset set in the node.

2. The control device according to claim 1, further comprising a shift information calculation unit that calculates the shift information including an external movement amount in a program coordinate system, wherein the shift addition node designation unit designates a workpiece coordinate system node indicating a workpiece coordinate system on the graph, and the shift information setting unit sets the shift information for a position offset and/or a posture offset of the workpiece coordinate system node.

3. The control device according to claim 1, wherein the shift information includes an external movement amount in a motor coordinate system, the shift addition node designation unit designates a plurality of the motor coordinate system nodes indicating a motor coordinate system of each axis in the graph, and the shift information setting unit sets the shift information for position offsets and/or posture offsets of the plurality of nodes.

4. The control device according to claim 1, wherein the shift information includes the external movement amount indicating a positional difference between the machine tool and the robot measured by a measuring device, the shift addition node designation unit designates a world coordinate system node on the graph, and the shift information setting unit sets the shift information for a position offset and/or a posture offset of the world coordinate system node.

* * * * *